(12) United States Patent
Yasuda

(10) Patent No.: US 6,604,451 B1
(45) Date of Patent: Aug. 12, 2003

(54) FLUID ACTUATOR

(75) Inventor: Masashi Yasuda, Amagasaki (JP)

(73) Assignee: Tokkyokiki Corporation (JP)

( * ) Notice: Subject to any disclaimer, the term of this patent is extended or adjusted under 35 U.S.C. 154(b) by 0 days.

(21) Appl. No.: 09/831,252

(22) PCT Filed: Nov. 12, 1999

(86) PCT No.: PCT/JP99/06325

§ 371 (c)(1),
(2), (4) Date: May 7, 2001

(87) PCT Pub. No.: WO00/29753

PCT Pub. Date: May 25, 2000

(30) Foreign Application Priority Data

Nov. 13, 1998 (JP) .............................. 10-323472
Feb. 1, 1999 (JP) .............................. 11-023834

(51) Int. Cl.$^7$ ................................................. F01B 19/00
(52) U.S. Cl. ............................... 92/48; 60/698; 248/550
(58) Field of Search ............................. 92/48, 49, 110, 92/112; 60/698, 716; 248/550

(56) References Cited

U.S. PATENT DOCUMENTS

| 825,866 | A | * | 7/1906 | Roger | ............................ 92/110 |
| 2,116,046 | A | * | 5/1938 | Schmutz | ........................... 92/48 |
| 2,983,256 | A | * | 5/1961 | Seeloff | ........................... 92/110 |
| 3,457,840 | A | * | 7/1969 | Grimes | ............................ 92/111 |
| 3,554,088 | A | * | 1/1971 | Bruyn | ............................ 92/111 |
| 3,783,620 | A | * | 1/1974 | Moe | ............................ 92/151 |
| 4,186,649 | A | | 2/1980 | Sundstrom | ................. 91/170 R |
| 5,121,898 | A | | 6/1992 | Yasuda et al. | |
| 5,379,980 | A | * | 1/1995 | Houghton et al. | ........... 248/550 |
| 5,673,897 | A | * | 10/1997 | Crochet et al. | .............. 137/244 |
| 6,021,991 | A | * | 2/2000 | Mayama et al. | .......... 144/134.1 |

FOREIGN PATENT DOCUMENTS

| JP | 35-6820 | 4/1960 |
| JP | 3-219141 | 9/1991 |
| JP | 7-76576 | 8/1995 |

* cited by examiner

Primary Examiner—Edward K. Look
Assistant Examiner—Igor Kershteyn
(74) Attorney, Agent, or Firm—Ostrolenk, Faber, Gerb & Soffen, LLP

(57) ABSTRACT

A fluid actuator applicable to high load with small space, comprising a core with an output shaft and two discs; and a cylinder casing which receives the core in a hollow, an upper end of the upper shaft projecting out of an upper opening and the core is set free. The cylinder casing includes an annular protrusion projecting into an air gap between the discs, wherein a small seal member which seals upper and lower spaces is provided between a portion of the core located between the discs and an annular protrusion and a large seal member which seals upper and lower spaces is provided between an inner peripheral surface of the cylinder casing, and an outer peripheral surface of the discs. The interior of the cylinder casing is divided into four small cavities abutting on one another vertically and an effective pressure-receiving area of the large seal member is larger than that of the small seal member to each of the small cavities.

21 Claims, 18 Drawing Sheets

FLUID ACTUATOR

TECHNICAL FIELD

The present invention relates to a fluid actuator suitable for use in vibration removing of high precision measuring apparatus and semiconductor manufacturing apparatus, for example.

BACKGROUND ART

Conventionally, fluid actuators, such as air spring, air cylinder, and hydraulic cylinder, have been well known. In such fluid actuators, while on one hand a supporting load or operating force by the fluid actuator is determined by internal pressure and effective pressure-receiving area, on the other hand the pressure of the fluid to be supplied is limited. Therefore, in order to make it possible to use the fluid actuator in a high load application, there is no other way than enlarging the effective pressure-receiving area.

For example, JP B H7-76576 (examined) and JP A H3-219141(unexamined) disclose apparatuses in which an air spring is used for suppressing vibration. In order to enlarge the force of such air springs, it is necessary to increase the number of air springs.

In the field of precision working, in order to suppress a rise in the cost for maintaining clean environment, it is required that the equipment be made more intensive without exerting bad influence upon precision working. On the other hand, there are demands for larger size and higher speed of the equipment, and this makes it more and more necessary to improve the support capability per unit area and controlling force with respect to the equipment. That is, it is required that a large controlling force be generated in a small space and vibration controllability be improved in a wide frequency range. This poses a problem that it is not possible to increase the number of fluid actuators, and to enlarge the effective pressure-receiving area.

DISCLOSURE OF THE INVENTION

An object of the present invention is to provide a fluid actuator which eliminates the foregoing problem and which can be applied to high loads with small space.

In order to achieve the above object, according to the present invention, there is provided a fluid actuator comprising: a core having a plurality of discs protruding around an output shaft; a cylinder casing which has a body of hollow configuration with an opening provided at its upper portion, and which receives the core in the hollow body in a state where not only an upper end of the output shaft is projected out of the opening but a lower portion of the core is set free, and which has an annular protrusion projecting into an air gap between the discs; an annular small seal member interposed between a portion of the core located between the discs and the annular protrusion so as to allow their relative movement in upward and downward directions and so as to partition upper and lower cavities from one to the other; and an annular large seal member interposed between an inner peripheral surface of the cylinder casing and outer periphery portion of the discs so as to allow their relative movement in upward and downward directions and so as to partition upper and lower cavities from each other, wherein a plurality of small cavities are defined by being partitioned by the small seal member and the large seal member so as to be arrayed vertically, one of a first group of the small cavities in odd-numbered stages counted from a bottom and a second group of the small cavities in even-numbered stages counted from the bottom communicate with the atmosphere and the other of the first group and the second group communicate with one another, at least one small cavity of the other of the first group and the second group communicates with a fluid flow passage for supplying and discharging pressurized fluid, and an effective pressure-receiving area on the large seal member side is larger than an effective pressure-receiving area on the small seal member side in each of the small cavities.

Further, according to the present invention, there is provided a fluid actuator comprising: a core having a plurality of discs protruding around an output shaft; a cylinder casing which has a body of hollow configuration with an opening provided at its upper portion, and which receives the core in the hollow body in a state where not only an upper end of the output shaft is projected out of the opening but a lower portion of the core is set free, and which has an annular protrusion projecting into an air gap between the discs; an annular small seal member interposed between a portion of the core located between the discs and the annular protrusion so as to allow their relative movement in upward and downward directions and so as to partition upper and lower cavities from one to the other; and an annular large seal member interposed between an inner peripheral surface of the cylinder casing and an outer periphery portion of the discs so as to allow their relative movement in upward and downward directions and so as to partition upper and lower cavities from each other, wherein a plurality of small cavities are defined by being partitioned by the small seal member and the large seal member so as to be arrayed vertically, a first group of the small cavities in odd-numbered stages counted from a bottom communicate with one another, at least one small cavity in the first group communicating with a first fluid flow passage for supplying and discharging pressurized fluid, a second group of the small cavities in even-numbered stages counted from the bottom communicate with one another, at least one small cavity in the second group communicating with a second fluid flow passage for supplying and discharging pressurized fluid, and an effective pressure-receiving area on the large seal member side is larger than an effective pressure-receiving area on the small seal member side in each of the small cavities.

Furthermore, according to the present invention, there is provided a fluid actuator comprising: a cylinder casing opened at its upper portion; a core disposed inside the cylinder casing; a small seal member which is interposed between the cylinder casing and the core and which does not interfere with upward and downward relative movement of the cylinder casing and the core; a large seal member which is interposed in alternate relation with the small seal member between the core and the cylinder casing and which does not interfere with upward and downward relative movement of the core and the cylinder casing, and further which has an effective pressure-receiving area larger than that of the small seal member; a fluid flow passage for supplying pressurized fluid to a small cavity defined by the small seal member and the large seal member in odd-numbered stage counted from a bottom, and for discharging the fluid present in the small cavity; and an opening which allows a small cavity defined by the small seal member and the large seal member in even-numbered stage counted from the bottom to communicate with the atmosphere.

Still furthermore, according to the present invention, there is provided a fluid actuator comprising: a cylinder casing opened at its upper portion; a core disposed inside the cylinder casing; a small seal member which is interposed between the cylinder casing and the core and which does not interfere with upward and downward relative movement of the cylinder casing and the core; a large seal member which is interposed in alternate relation with the small seal member between the core and the cylinder casing and which does not interfere with upward and downward relative movement of the core and the cylinder casing, and further which has an effective pressure-receiving area larger than that of the small seal member; an opening which allows a first fluid flow passage to communicate with the atmosphere, the first fluid flow passage serving for supplying pressurized fluid into a small cavity defined by the small seal member and the large seal member in odd-numbered stage counted from a bottom, and for discharging the fluid in this small cavity; and a second fluid flow passage for supplying pressurized fluid to a small cavity defined by the small seal member and the large seal member in even-numbered stage counted from the bottom, and for discharging the fluid in this small cavity.

Still furthermore, according to the present invention, there is provided a fluid actuator comprising: a cylinder casing opened at its upper and lower portions; a core disposed inside the cylinder casing; a small seal member which is interposed between the cylinder casing and the core and which does not interfere with upward and downward relative movement of the cylinder casing and the core; a large seal member which is interposed between the core and the cylinder casing and which does not interfere with upward and downward relative movement of the core and the cylinder casing, and further which has an effective pressure-receiving area larger than that of the small seal member; and a fluid flow passage for supplying pressurized fluid to a small cavity defined by the small seal member and the large seal member and for discharging the fluid in this small cavity.

Still furthermore, according to the present invention, there is provided a fluid actuator comprising: a cylinder casing opened at its upper and lower portions; a core disposed inside the cylinder casing; a small seal member which is interposed between the cylinder casing and the core and which does not interfere with upward and downward relative movement of the cylinder casing and the core; a large seal member which is interposed in alternate relation with the small seal member between the core and the cylinder casing and which does not interfere with upward and downward relative movement of the core and the cylinder casing, and further which has an effective pressure-receiving area larger than that of the small seal member; a fluid flow passage for supplying pressurized fluid to a small cavity defined by the small seal member and the large seal member in one of odd-numbered stage and even-numbered stage counted from a bottom, and for discharging the fluid in this small cavity; and an opening which allows a small cavity, defined by the small seal member and the large seal member in the other of the odd-numbered stage and the even-numbered stage, to communicate with the atmosphere.

Still furthermore, according to the present invention, there is provided a fluid actuator comprising: a cylinder casing opened at its upper and lower portions; a core disposed inside the cylinder casing; a small seal member which is interposed between the cylinder casing and the core and which does not interfere with upward and downward relative movement of the cylinder casing and the core; a large seal member which is interposed in alternate relation with the small seal member between the core and the cylinder casing and which does not interfere with upward and downward relative movement of the core and the cylinder casing, and further which has an effective pressure-receiving area larger than that of the small seal member; a first fluid flow passage for supplying pressurized fluid to a small cavity defined by the small seal member and the large seal member in one of odd-numbered stage and even-numbered stage counted from a bottom, and for discharging the fluid in this small cavity; and a second fluid flow passage for supplying pressurized fluid to a small cavity defined by the small seal member and the large seal member in the other of the odd-numbered stage and even-numbered stage, and for discharging the fluid in this small cavity.

DETAILED DESCRIPTION OF THE PREFERRED EMBODIMENTS

Embodiments of the present invention are described below with reference to the accompanying drawings.

Figure 1:
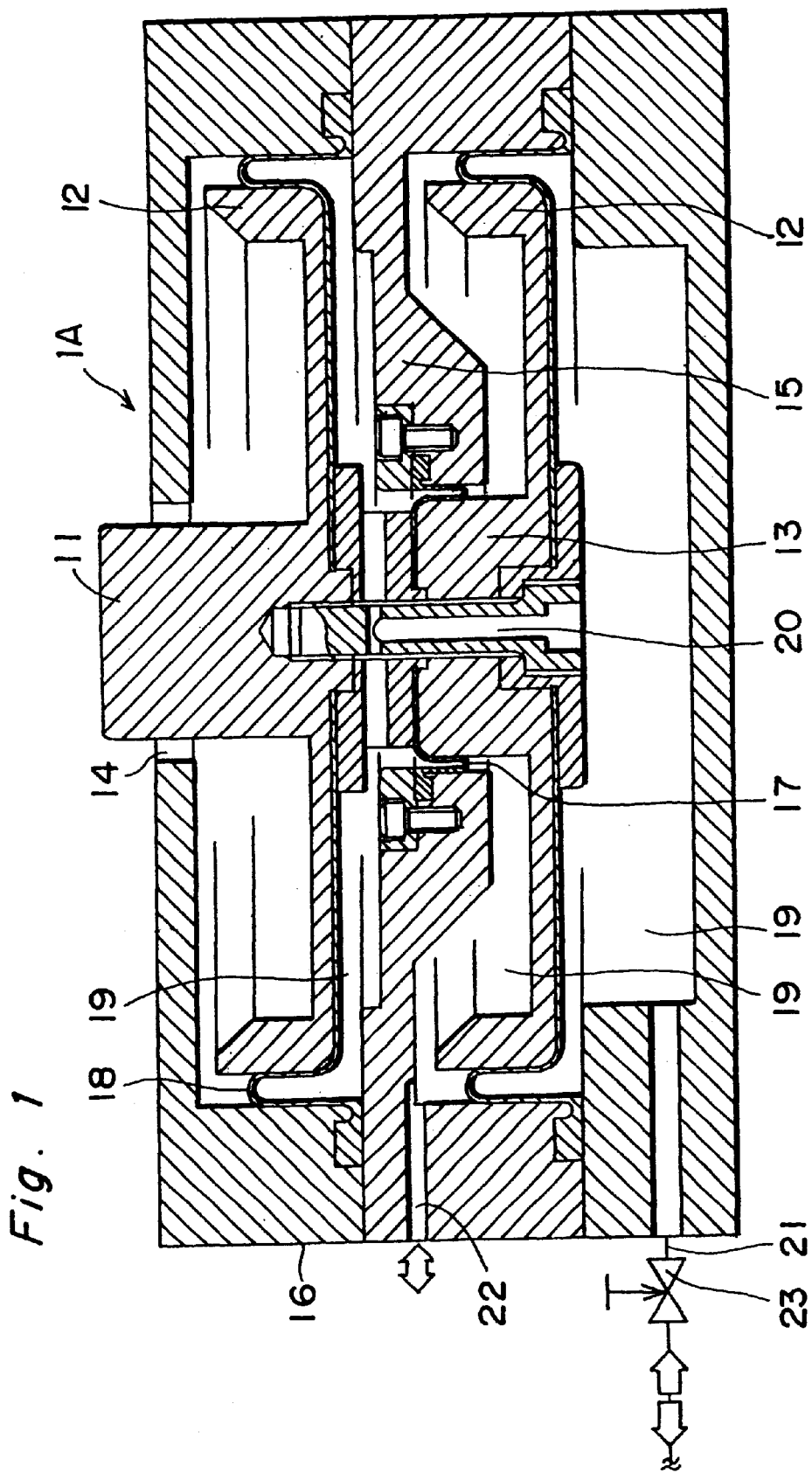
FIG. 1 is a sectional view of a fluid actuator according to a first embodiment of the present invention.

FIG. 1 shows a fluid actuator 1A according to a first embodiment of the present invention. The fluid actuator 1A comprises a core 13 having two discs 12 protruding from an outer periphery of an output shaft 11, and a cylinder casing 16 which has a hollow configuration with an opening 14 provided in its upper portion, and which receives the core 13 within the hollow body in a state where a lower portion of the core 13 is set free, and further which has an annular protrusion 15 projecting into an air gap between the discs 12, 12.

Between a portion of the core 13 positioned between the discs 12, 12 and the annular protrusion 15, a small diaphragm 17 is interposed for allowing upward and downward relative movement between the core 13 and the annular protrusion 15 and for partitioning upper and lower cavities. Between the inner peripheral surface of the cylinder casing 16 and the outer peripheral portion of disc 12, a large diaphragm 18 is interposed, for allowing upward and downward relative movement between the cylinder casing 16 and the discs 12 and for partitioning upper and lower cavities. By this arrangement, the cavity within the cylinder casing 16 is partitioned into four vertically abutting small cavities 19. Meanwhile, in the small cavities 19, an effective pressure-receiving area on the large diaphragm 18 side is larger than an effective pressure-receiving area on the small diaphragm 17 side. The small diaphragm 17 and large diaphragm 18 are comprised of a member which has a sealing capability and enables relative displacement of an inner periphery side member and an outer periphery side member. It follows from the above that the diaphragms 17, 19 allow for friction-less relative movement of the parts.

Small cavities 19 in odd-numbered stages counted from a bottom of the cylinder casing 16, that is, in the first and third stages counted from the bottom communicate with each other. There are various methods of communication, which are not limitative. In the embodiments shown herein, the small cavities 19, 19 in the first and third stages communicate with each other by means of a through hole 20 bored in the output shaft 11. Preferably, this through hole 20 has as large a cross section as possible in order to reduce the fluid friction. Further, the small cavity 19 in the first stage is connected to a fluid flow passage 21 for supplying and discharging a pressurized fluid, while the small cavities 19, 19 in the first and third stages are arranged in series.

On the other hand, small cavities 19 in even-numbered stages counted from the bottom of the cylinder casing 16, that is, the in the second stage counted from the bottom communicate with the atmosphere. More specifically, the small cavity 19 in the second stage communicates with the atmosphere by means of a through hole 22 bored in a side wall of the cylinder casing 16.

On the fluid flow passage 21, a control valve 23 for controlling the fluid flow is provided, and the fluid actuator 1A is controlled by this control valve 23. As to this fluid, for example, oil as well as gases such as air, nitrogen, carbon dioxide and helium are preferable.

In addition, the fluid flow passage 21 may communicate with the small cavity 19 in the third stage instead of the small cavity 19 in first stage.

With this arrangement, since each of the small cavities 19 in the even-numbered stage counted from the bottom of the cylinder casing 16, functions as single fluid actuators independent of one another, the fluid actuator 1A occupies an installation area of a single conventional fluid actuator such as a single air spring or air cylinder or hydraulic cylinder corresponding to one small cavity 19 and has a capability equal to a sum of capabilities of the two conventional fluid actuators. Accordingly, by such an arrangement, it becomes possible to apply the fluid actuator 1A to high load applications with small installation space.

Figure 2:
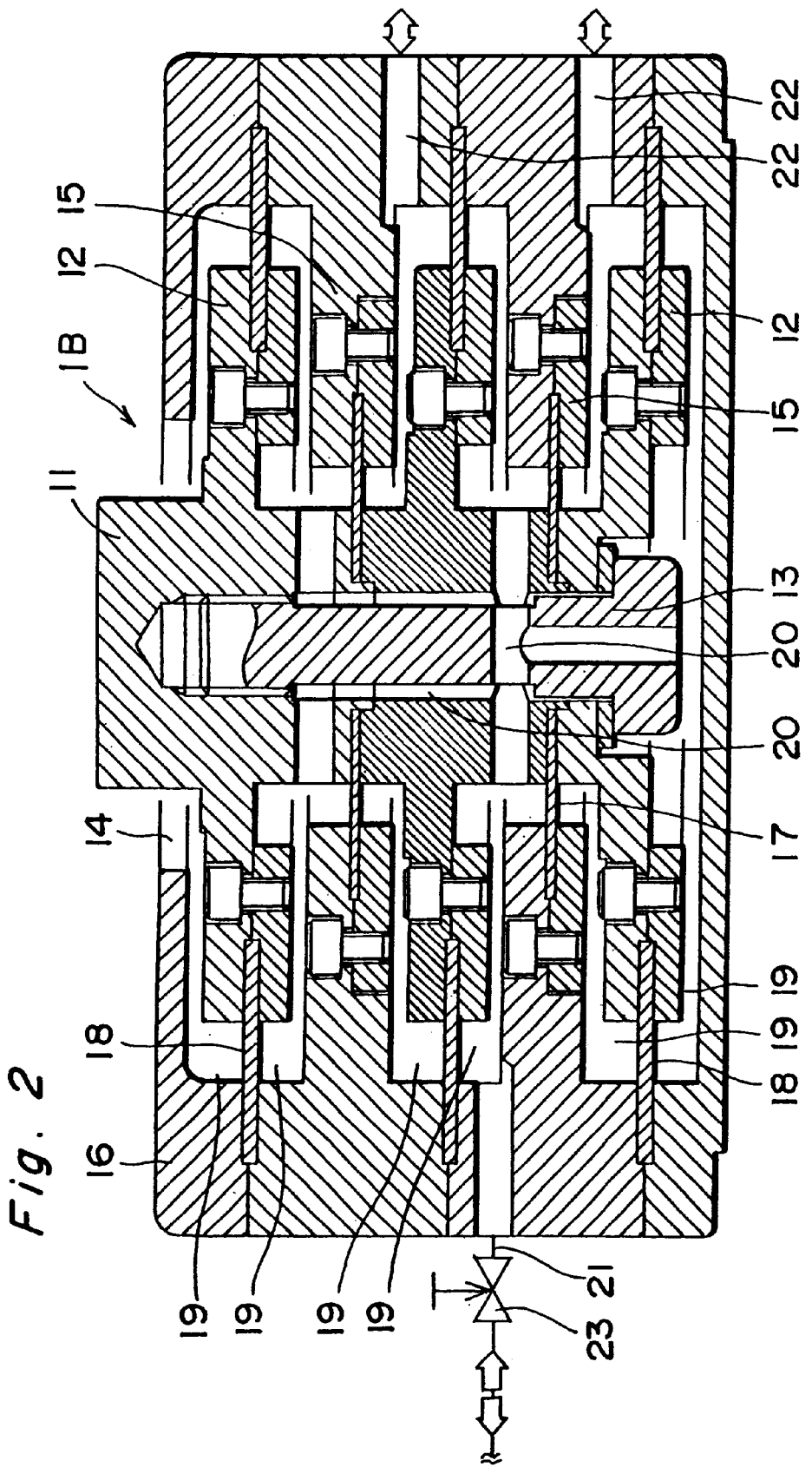
FIG. 2 is a sectional view of a fluid actuator according to a second embodiment of the present invention.

FIG. 2 shows a fluid actuator 1B according to a second embodiment of the present invention, where parts common to the foregoing fluid actuator 1A are designated by the same reference numerals and their description is omitted.

This fluid actuator 1B, basically, differs from the fluid actuator 1A shown in FIG. 1 only in the number of the small cavities 19 and otherwise substantially identical in structure. More specifically, the fluid actuator 1B is so structured that six small cavities 19 are placed within the cylinder casing 16 so as to be vertically adjacent to one another. The small cavities 19 in even-numbered stages counted from the bottom of the cylinder casing 16 communicate with one another by means of a through hole 20 formed in the output shaft 11. Further, a fluid flow passage 21 is connected to the small cavity 19 in a third stage counted from the bottom, so as to communicate therewith, while the small cavities 19 in the first, third and fifth stages are arranged in series.

Thus, by increasing the number of small cavities 19, the fluid actuator 1B has a capability equal to a sum of the capabilities of conventional fluid actuators, each of which corresponds to each of the small cavities 19 in the even-numbered stages counted from the bottom, that is, a capability equal to a sum of three fluid actuators' capabilities, and yet only requires an installation area identical to the installation area necessary for a single conventional fluid actuator corresponding to one small cavity 19.

In addition, the present invention also includes a fluid actuator in which the small cavities 19 where the pressurized fluid flows in and out are arranged not only in series so as to communicate with one another via the through hole 20 as described above, but also in parallel so as to communicate directly with the fluid flow passage 21.

Furthermore, in the above embodiments, the small cavities 19 are arranged in parallel so as to communicate directly with the atmosphere. However, the present invention also includes a fluid actuator in which the small cavities 19 are arranged in series so as to communicate with the atmosphere via other small cavities 19.

Figure 3:
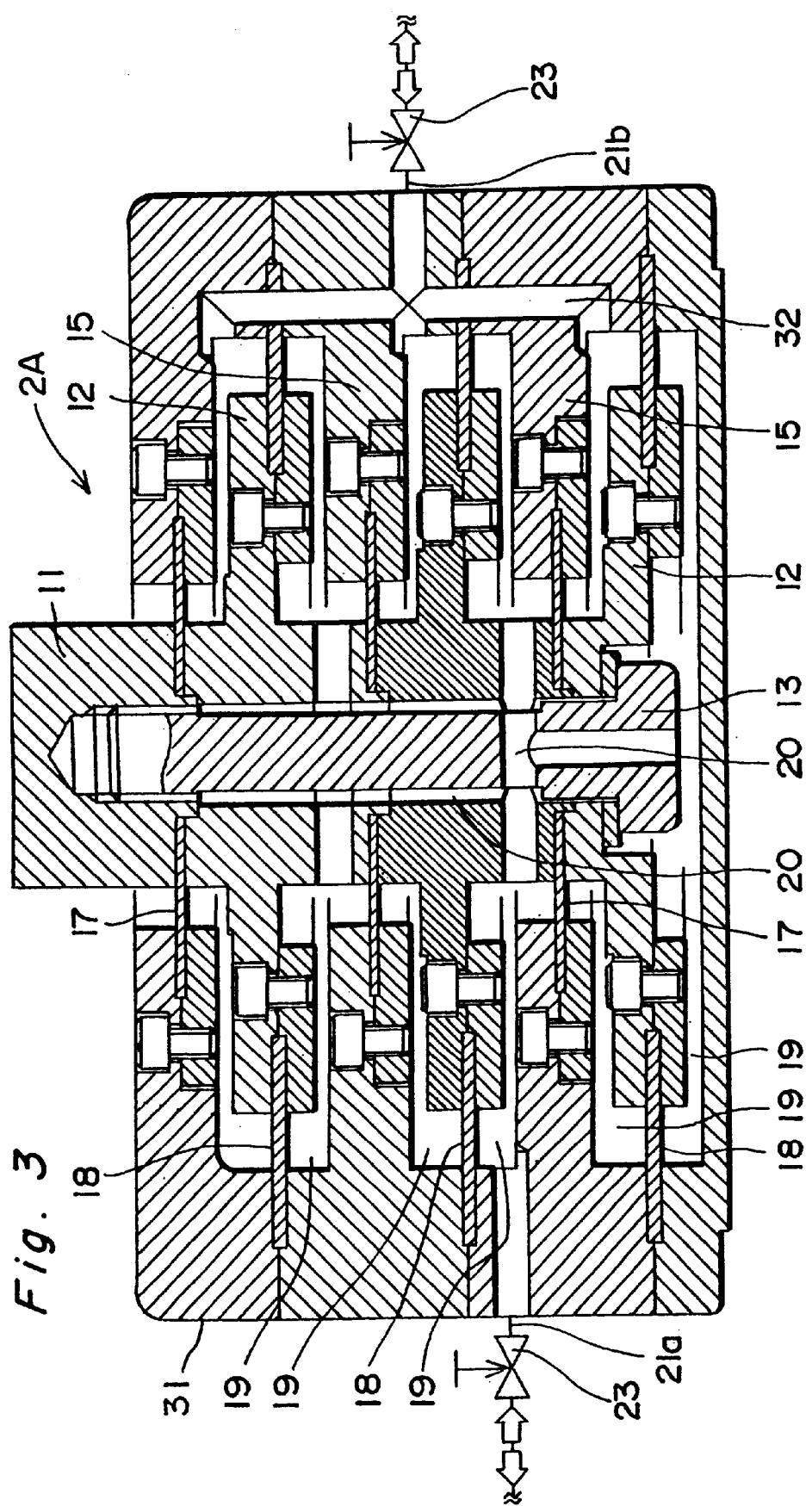
FIG. 3 is a sectional view of a fluid actuator according to a third embodiment of the present invention.

FIG. 3 shows a fluid actuator 2A according to a third embodiment of the present invention, where parts common to the foregoing fluid actuator are designated by the same reference numerals and their description is omitted.

This fluid actuator 2A has a cylinder casing 31 instead of the cylinder casing 16 of the above-described embodiments. The small cavities 19 within the cylinder casing 31 do not communicate with the atmosphere, and the uppermost small cavity 19 is shut off from outside by the small seal member 17.

The small cavities 19 in odd-numbered stages counted from the bottom of the cylinder casing 31 communicate with one another by means of a through hole 20 formed in the output shaft 11. Further, a first fluid flow passage 21a for supplying and discharging a pressurized fluid is connected to the small cavities 19 in third-numbered stage counted from the bottom, so as to communicate therewith.

On the other hand, the small cavities 19 in even-numbered stages counted from the bottom of the cylinder casing 31 communicate with one another by means of a through hole 32 formed in a side wall of the cylinder casing 31. Further, this through hole 32 is connected to a second fluid flow passage 21b which supplies and discharges a pressurized fluid, while the small cavities 19 in even-numbered stages counted from the bottom are arranged in parallel.

A pressure of the fluid supplied from each of the first fluid flow passage 21a and the second fluid flow passage 21b contains a static pressure component and a dynamic pressure component. In the case where the dynamic pressure components of the first fluid flow passage 21a and the second fluid flow passage 21b are in opposite phase to each other, a force due to the fluid pressure of the first fluid flow passage 21a and a force due to the fluid pressure of the second fluid flow passage 21b are summed up, and the summed-up force acts on the output shaft 11. Conversely, in the case where the dynamic pressure components of the first fluid flow passage 21a and the second fluid flow passage 21b are in phase with each other, a force due to the fluid pressure of the first fluid flow passage 21a and a force due to the fluid pressure of the second fluid flow passage 21b cancel each other, and a force remaining as a difference between the two forces acts on the output shaft 11. Therefore, in the fluid actuator 2A using the first fluid flow passage 21a and the second fluid flow passage 21b, the output shaft 11 can be held in a position where forces due to the pressures of the first fluid flow passage 21a and the second fluid flow passage 21b, respectively, are balanced, and besides, forces due to static pressure components of the first fluid flow passage 21a and the second fluid flow passage 21b, respectively, cancel each other so that only their respective dynamic pressure components can act on a driven member.

In addition, also in this fluid actuator 2A, the necessary installation area is the same as the aforementioned installation area required for a single conventional fluid actuator corresponding to one small cavity 19.

Figure 4:
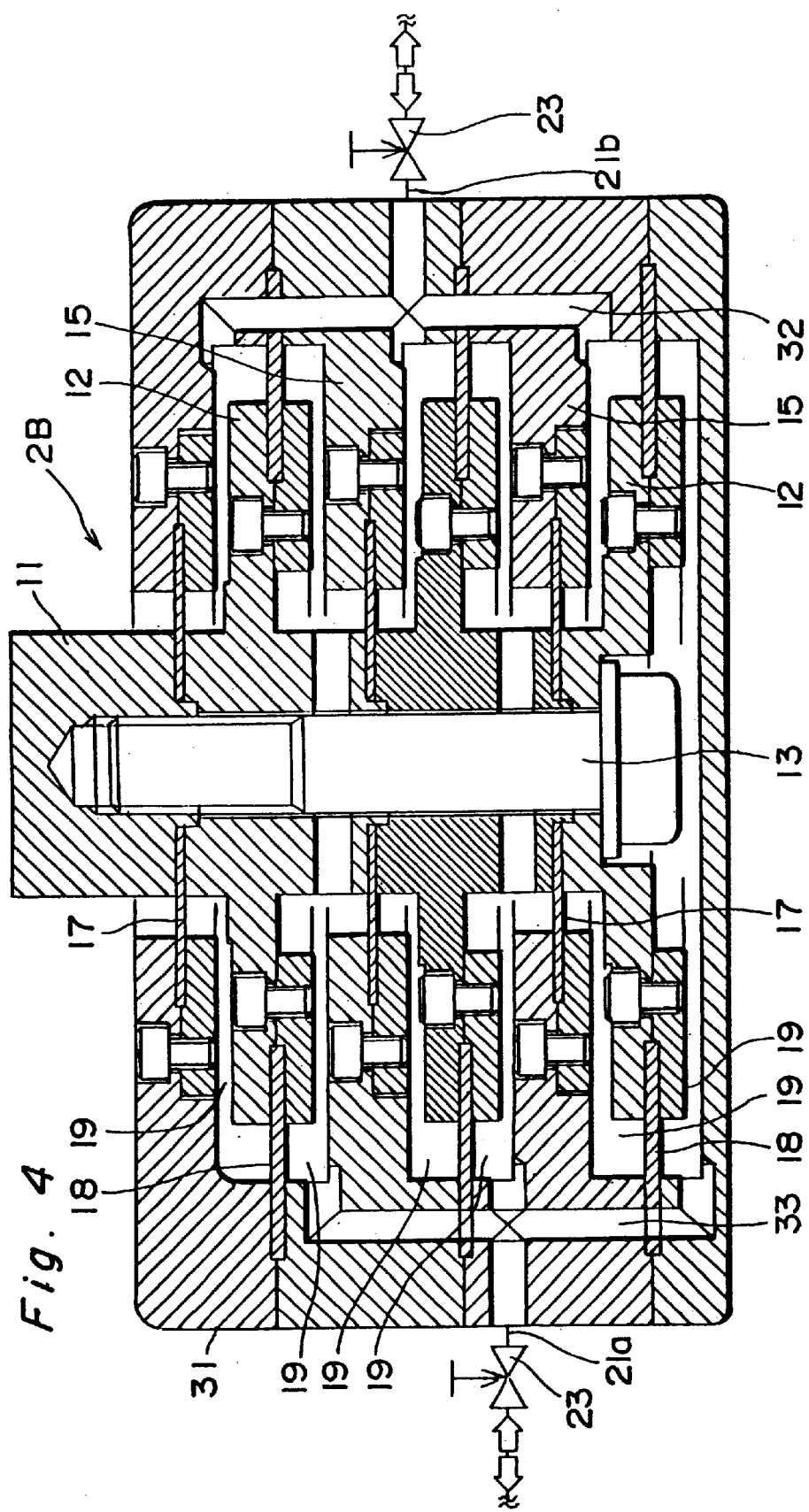
FIG. 4 is a sectional view of a fluid actuator according to a fourth embodiment of the present invention.

FIG. 4 shows a fluid actuator 2B according to a fourth embodiment of the present invention, where parts common to the foregoing fluid actuator are designated by the same reference numerals and their description is omitted.

In this fluid actuator 2B, the small cavities 19 in odd-numbered stages counted from the bottom of the cylinder casing 31 communicate with one another by means of a through hole 33 formed in a wall portion of the cylinder casing 31. Except that the through hole 33 is provided instead of the through hole 20, the fluid actuator 2B is substantially the same as the fluid actuator 2A. In this fluid actuator 2B, not only the small cavities 19 in even-numbered stages counted from the bottom but also the small cavities 19 in odd-numbered stages counted from the bottom are arranged in parallel.

In the case of a first type fluid actuator in which the core 13 is exposed only at its upper portion and to which one kind of fluid flow passage, i.e., the fluid flow passage 21 is connected as in the first and second embodiments, an effective pressure-receiving area S is expressed by the following equation:

$$S = n \cdot A - (n-1) \cdot a$$

Where
  a is the effective pressure-receiving area of the small seal member 17;
  A is the effective pressure-receiving area of the large seal member 18; and
  n is the number of small cavities 19 where pressurized fluid flows in and out and which communicate with each other.

Furthermore, in the case of a second type fluid actuator in which the core 13 is exposed only at its upper portion and to which two kinds of fluid flow passage, i.e., the first fluid flow passage 21a and the second fluid flow passage 21b are connected as in the third and fourth embodiments, while the above equation applies likewise to the small cavities 19 in odd-numbered stages counted from the bottom, the effective pressure-receiving area S as to the small cavities 19 in even-numbered stages counted from the bottom is expressed by the following equation:

$$S = n \cdot (A - a)$$

Figure 5:
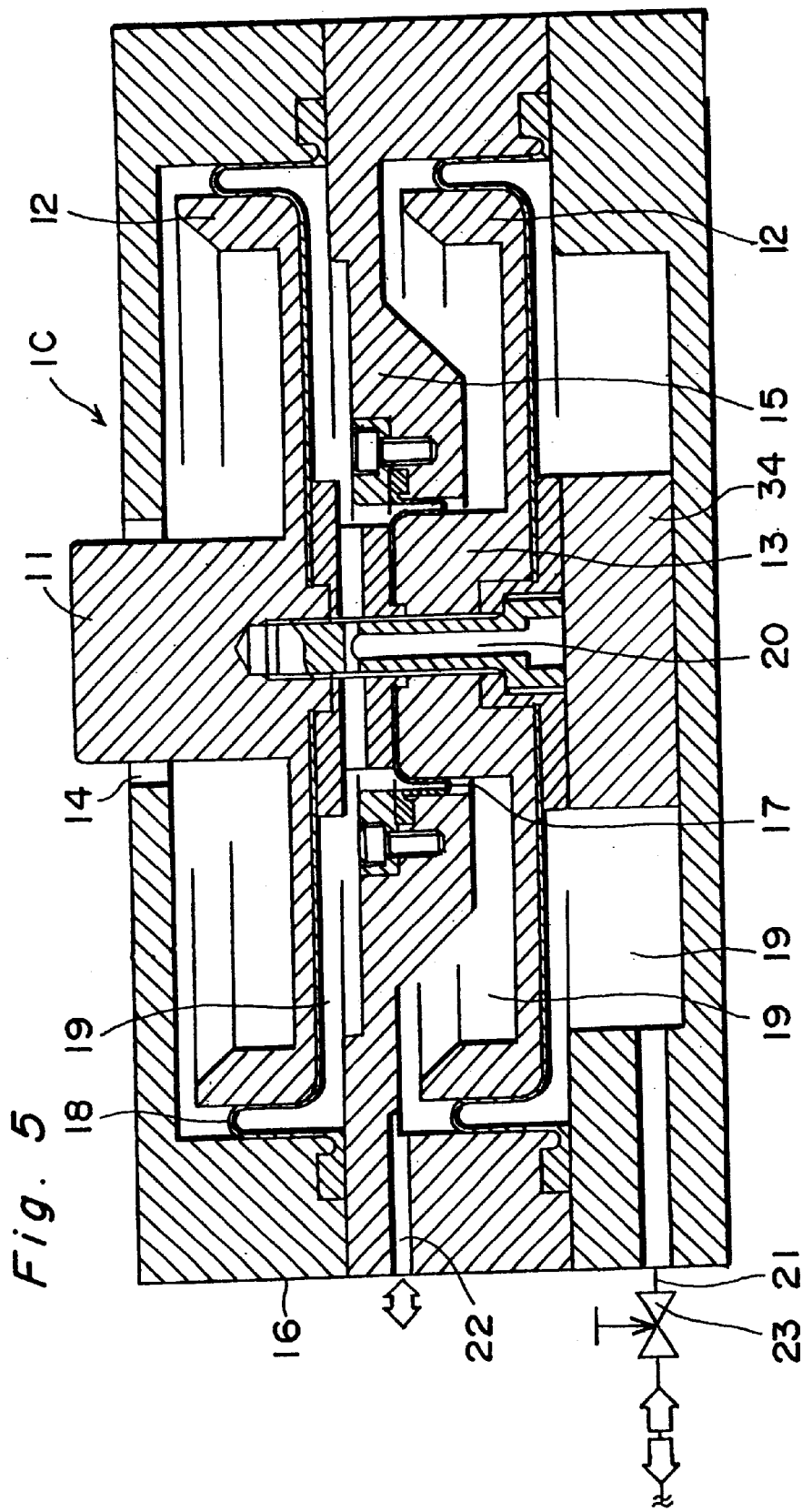
FIG. 5 is a sectional view of a fluid actuator according to a fifth embodiment of the present invention.
Figure 6:
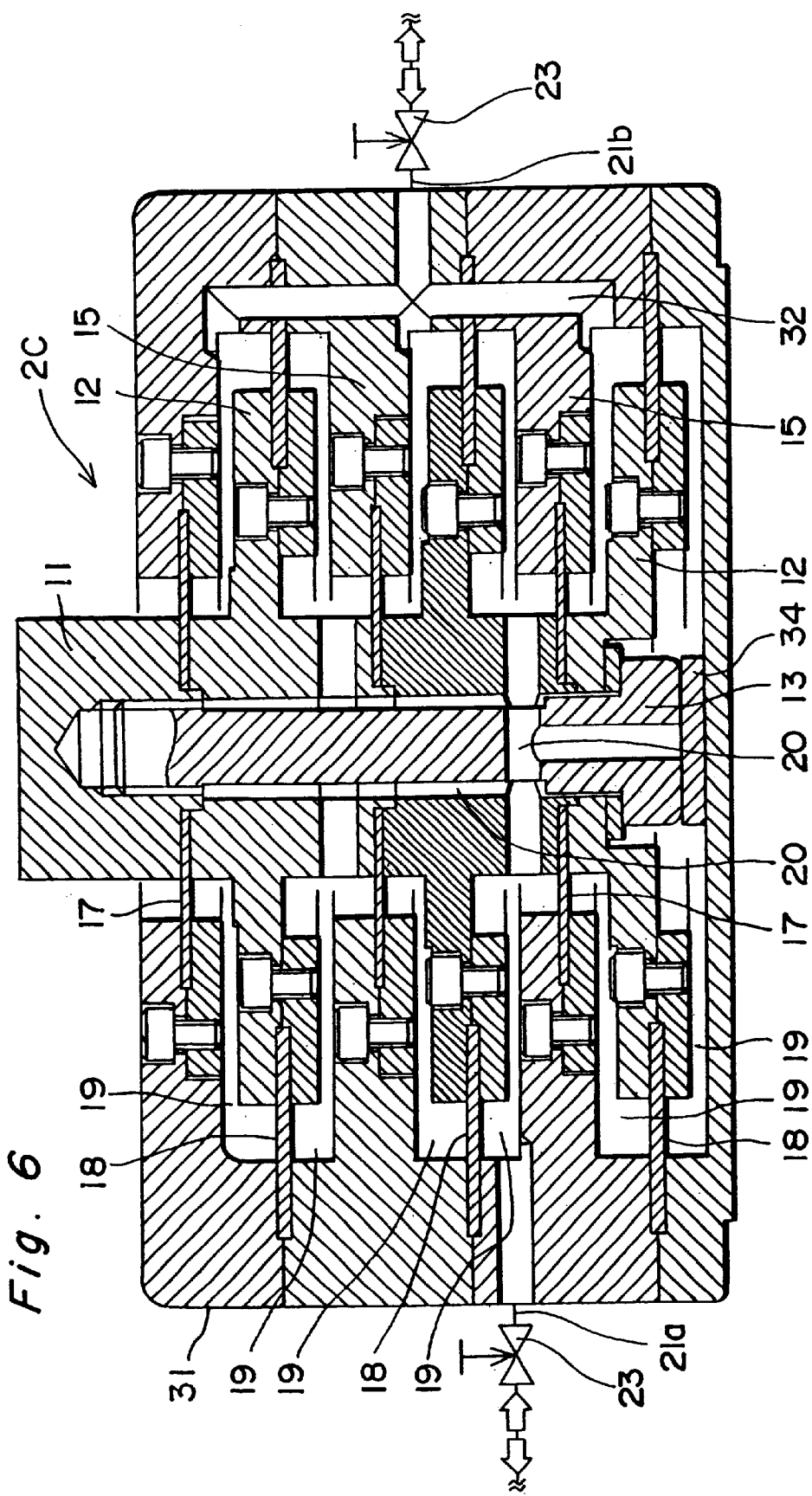
FIG. 6 is a sectional view of a fluid actuator according to a sixth embodiment of the present invention.

FIG. 5 shows a fluid actuator 1C of the first type according to a fifth embodiment of the present invention, and FIG. 6 shows a fluid actuator 2C of the second type according to a sixth embodiment of the present invention. In FIGS. 5 and 6, parts common to the foregoing fluid actuators are designated by the same reference numerals and their description is omitted.

In these fluid actuators 1C, 2C, an elastic member 34 is provided between the bottom face of the cylinder casing 16 or 31 and the discs 12 opposed thereto. This elastic member 34 comprises, for example, an elastomer or rubber, or a spring or the like, but these are not limitative. The elastic member 34 may also be formed in combination of different kinds of materials, or by stacking these members.

Thus, in the above fluid actuator 1A or 2A, the elastic member 34 is incorporated in parallel to the fluid actuator 1A or 2A, i.e., so as to restrain the drive by the fluid actuator 1A or 2A, so that a force can act on a driven member with a spring constant larger than that of the fluid actuator 1A or 2A.

Like the fluid actuators 1C and 2C shown in FIGS. 5 and 6, the elastic member 34 can be applied to the fluid actuator 1B shown in FIG. 2 and the fluid actuator 2B shown in FIG. 4. The present invention also includes other fluid actuators of the first and second types to which this elastic member 34 is applied.

Figure 7:
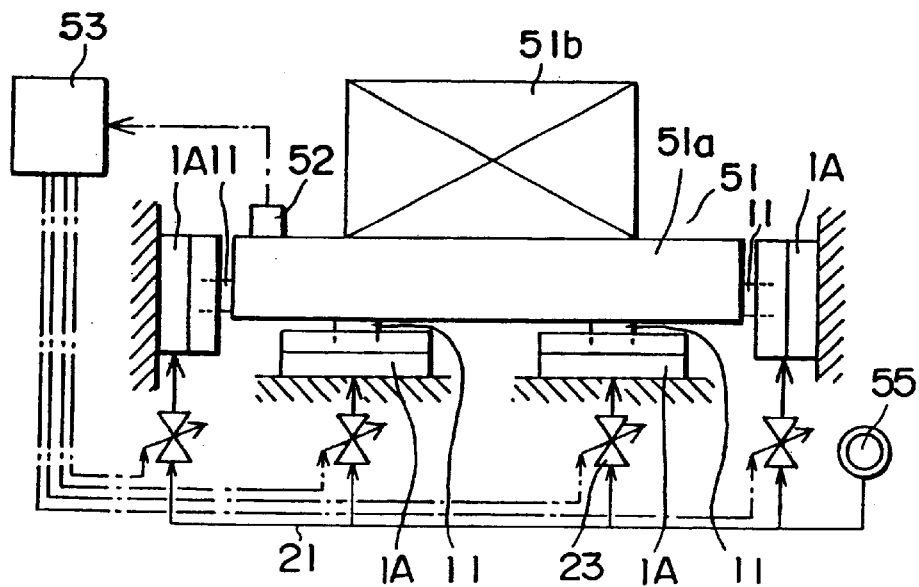
FIG. 7 shows an example of application of the fluid actuator shown in FIG. 1.

FIG. 7 shows an application example of the fluid actuator 1A.

Referring to the figure, reference numeral 51 denotes a driven member, and this driven member 51 comprises a surface plate 51a and a vibration controlled object 51b placed thereon such as a precision device. Further, in this figure, the driven member 51 is supported by four fluid actuators 1A, and conditions of movement such as velocity and acceleration of the driven member 51 are detected by a single sensor 52. However, as the controlled object of a rigid body system has six degrees of freedom, at least six sensors and six actuators are required for controlling the controlled object for all of the degrees of freedom. Generally, since the installation sites are limited in spite of an attempt to fulfill the control at this minimum number, the control is performed by disposing at four corners of a rectangular shape eight actuators in total.

Accordingly, also in the case of the application example shown in FIG. 7, in addition to the fluid actuators 1A shown in the figure, for example, two fluid actuators 1A are placed in contact with a rectangular face of the surface plate 51a illustrated in FIG. 7 and with another face(not shown) of the surface plate 51a parallel to the above illustrated face. Further, in addition to the shown sensor 52, at least five sensors are provided. By these six sensors including the sensor 52, position, angle, velocity and acceleration of the driven member 51 or pressure of pressurized fluid within the fluid actuator 1A and the like are detected depending on the purpose of the control. In general, when a signal derived from this sensor 52 represents a displacement, the signal is used for position and attitude control of the driven member 51, and when the signal represents an acceleration, the signal is used for vibration control.

Detection signals are inputted from the sensor 52 and the other five sensors to a controller 53, and based on these detection signals, a control signal is outputted from the controller 53 to a control valve 23, such as a servo valve, provided for each fluid actuator 1A. This servo valve, which itself is well known, has input port, output port and control port which are not shown. Further, the input port is connected to a pressurized fluid supply source 55, the control port is connected to the fluid flow passage 21 so as to communicate with the small cavity 19 in the first-numbered stage, and the output port is opened to the atmosphere. Thus, the control valves 23 are actuated in response to a voltage signal which is a control signal outputted from the controller 53, so that a control force proportional to this voltage is generated in the small cavities 19 via the fluid supplied from the pressurized fluid supply source 55. It is needless to say that this pressurized fluid is supplied to the small cavities 19 in one case, and discharged from the small cavities 19 in another case.

In this way, the control for the fluid actuators 1A is performed, and action of the driving force on the driven member 51 according to the purpose can be obtained. For example, vibration removing or position and attitude control or the like on the driven member 51 is performed.

The control valves 23, without being limited to electrical type, may be mechanical type, one example of which is disclosed in JP A H3-219141. The control valve described in this publication JP A H3-219141 is a mechanical three-way switching valve which is actuated by a lever, and which performs position control of the surface plate of a vibration removing table using an air spring. In more detail, while an end portion of the lever is kept in contact with the surface plate to monitor the position of the surface plate, supply and discharge of the fluid is performed by the control valve in correspondence to a displacement of a plunger of the control valve from its original position so that the plunger is slid through an amount proportional to a displacement amount of the surface plate.

Needless to say, another fluid actuator of the first or second type may be applied instead of the fluid actuator 1A in FIG. 7.

When a fluid actuator of the second type is applied instead of the fluid actuator 1A in FIG. 7, it may be arranged that a control valve interveniently provided on the first fluid flow passage 21a communicating with the small cavities 19 in odd-numbered stages, as well as another control valve interveniently provided on the second fluid flow passage 21b communicating with the small cavities 19 in even-numbered stages are controlled by a single controller 53. However, for the second type fluid actuators such as the fluid actuator 2A, 2B or 2C, it is not necessarily required that the fluid actuators be placed on both sides of the driven member 51 in an opposing arrangement as shown in FIG. 7.

Figure 8:
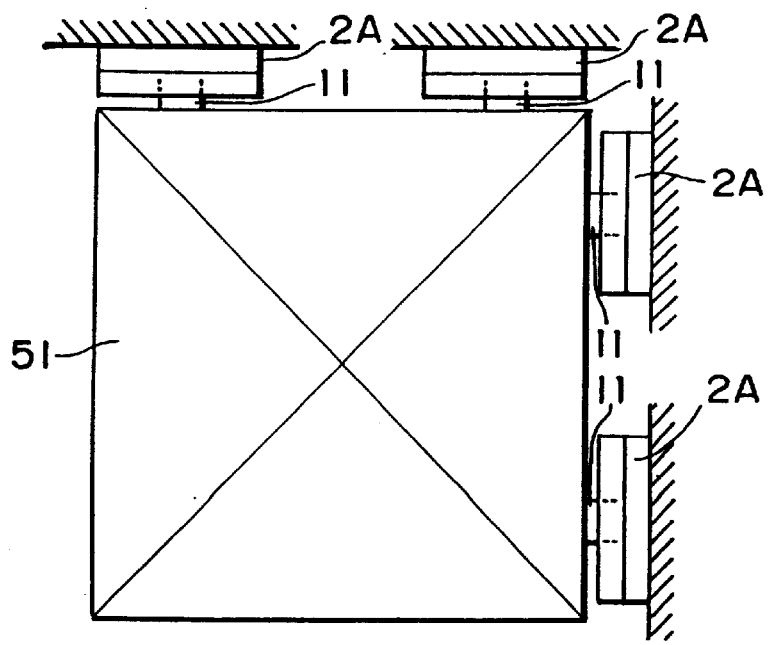
FIG. 8 shows an example of application of the fluid actuator shown in FIG. 2.

That is, as shown in FIG. 8, with respect to two opposing faces of the driven member 51, the output shaft 11 of the fluid actuator of the second type, for example, the fluid actuators 2A may be fixed to one face of the driven member 51, in which case a control force can be operated on the driven member 51 similarly. Whereas the fluid actuators 1A, 1B and 1C need to be placed oppositely on both sides of the driven member 51 so as to maintain the static pressure balance, the fluid actuators 2A may be placed on either one surface out of the opposing surfaces for maintaining the static pressure balance. This is the case also with the fluid actuators 2B and 2C.

Meanwhile, in the above described application examples, a signal from one sensor may be used for the control of a plurality of control valves, and conversely, signals from a plurality of sensors may be used for the control of one control valve.

In addition, when a fluid actuator according to the present invention is applied to a driven member, it is preferable that a force from the driven member does not act on the output shaft of the fluid actuator as a shearing force in a direction perpendicular to the longitudinal direction of the output shaft. That is, it is desirable that a member or a mechanism for letting the shearing force escape be provided interveniently between the output shaft and the driven member or that the output shaft itself be formed so as to absorb the shearing force. A member that acts to conduct the longitudinal force and absorb the shearing force is already known, and such a member is exemplified by a wire or a laminate of metallic plate and rubber as disclosed in the aforementioned publication JP A H3-219141.

Subsequently, a hybrid actuator using the above-described fluid actuators according to the present invention is described.

Figure 9:
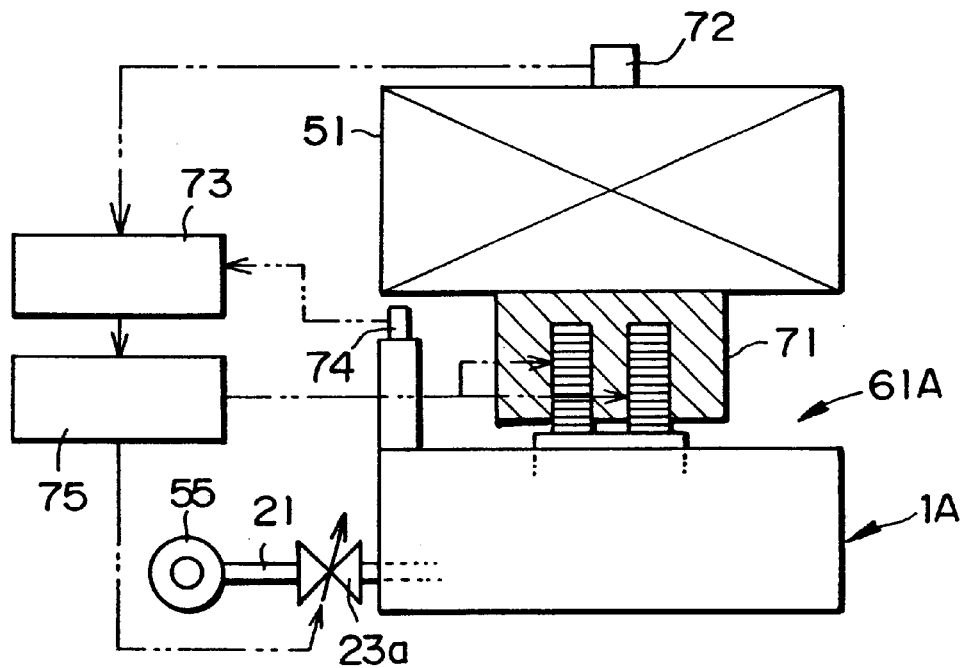
FIG. 9 shows an example of application of a hybrid actuator using the fluid actuator shown in FIG. 1.

FIG. 9 shows an application example of a hybrid actuator 61A using the above-described fluid actuator 1A. This hybrid actuator 61A comprises the fluid actuator 1A and a vibration actuator 71 arranged in series. Whereas this order of placement is not limitative, the vibration actuator 71 is provided between the fluid actuator 1A and the driven member 51 in the case of the hybrid actuator 61A shown in the FIG. 9.

A fluid flow passage 21 connected to the fluid actuator 1A extends from a pressurized fluid supply source 55, and a control valve 23a provided on the fluid flow passage 21 is an electrically driven servo valve having good responsibility. In the following description, the fluid from the pressurized fluid supply source 55 is assumed to be gas as an example.

This control valve 23a is an electromagnetic three-way valve having a supply port communicating with the pressurized fluid supply source 55, a control port communicating with the small cavity 19, and a discharge port communicating with the atmosphere. This control valve 23a serves to adjust the flow rate of pressurized gas introduced from the pressurized fluid supply source 55 to the small cavity 19 as well as the flow rate of gas discharged from the small cavity 19. When the control valve 23a is in a first state in which the flow rate of this pressurized gas is at a maximum, the discs 12 operate so as to expand the small cavities 19 by the pressure of the pressurized gas introduced from the pressurized fluid supply source 55 to the small cavities 19. On the other hand, when the control valve 23a is in a second state in which the discharge flow rate of the pressurized gas is at a maximum, the gas in the small cavities 19 flows out, so that the action of the gas pressure is weakened, causing the discs 12 to operate in a direction opposite to that of the first state.

The term vibration actuator 71 is meant to include a solid element actuator containing a solid element such as a piezoelectric-element which yields strain with a voltage applied or an ultra-magnetostriction element which yields strain under the action of a magnetic field, and besides a linear motor such as a voice coil motor (VCM). In addition to the operation of the fluid actuator 1A, this vibration actuator 71 expands and contracts up and down, thereby causing an upward or downward force to act on the driven member 51.

The driven member 51 is provided with a vibration sensor 72 for detecting vibration state of the driven member 51 in the vertical direction, and a detection signal showing the vibration state is inputted from this vibration sensor 72 to a controller 73. Further, the fluid actuator 1A is provided with a displacement sensor 74 for detecting vertical relative displacement of the driven member 51 with respect to the fluid actuator 1A, and a detection signal from this displacement sensor 74 is inputted to the controller 73. Based on these detection signals, a control signal is fed from the controller 73 to a driver 75 serving as both an actuator driver and a valve driver, and the vibration actuator 71 is actuated by this driver 75. Furthermore, air flow in the control port of the control valve 23a is controlled by this driver 75.

Meanwhile, the displacement sensor 74 may also be provided on the driven member 51 instead of the fluid actuator 1A, in which case relative displacement of the fluid actuator 1A with respect to the driven member 51 is detected by this displacement sensor 74.

More specifically, in the controller 73, an input signal is divided into high-frequency components and low-frequency components, and a control signal based on these high-frequency components is inputted to a vibration-actuator driver section of the driver 75, while a control signal based on the low-frequency components is inputted to a valve-driver section of the driver 75. The vibration-actuator driver section is connected to the vibration actuator 71, and the valve-driver section is connected to a valve-body driver portion of the control valve 23a. Thus, on the driven member 51, a driving force of high frequencies is effected by the vibration actuator 71, while a driving force of low frequencies is effected by the fluid actuator 1A.

As described above, in this hybrid actuator 61A, vibration control is dividedly allotted to the fluid actuator 1A and the vibration actuator 71, respectively, where the vibration signal from the driven member 51 is fed back not only to the vibration actuator 71 but also to the control valve 23a that controls the drive of the fluid actuator 1A. As a matter of course, without limitations to signals on the driven member 51, a ground motion signal detected from the installation site of the hybrid actuator 61A, for example, the floor surface may also be inputted to the controller 73 and, by using this ground motion signal in addition to the aforementioned signal, feed-forward control may be performed. That is, the method of simultaneous drive is not limitative. In this case, operation signals matching dynamic characteristics of the vibration actuator 71 and dynamic characteristics of the fluid actuator 1A, respectively, may be separated and generated by the controller 73. Since the method for this generation is not a principal point of the present patent application, this method is omitted in description. However, it has commonly been performed to change control gain according to the band based on differences in stroke and differences in response characteristics.

In the hybrid actuator 61A shown in FIG. 9, another fluid actuator of the first type may be applied instead of the fluid actuator 1A.

In addition, it is not necessarily required to separate high-frequency components and low-frequency components of the input signal in the controller 73. For example, a prefilter matching the dynamic characteristics (e.g., proportional type, integral type, derivative type) of the vibration actuator 71 and/or the fluid actuator 1A may be interveniently provided on the secondary side of the controller 73 so that a signal matching the vibration actuator 71 and/or the fluid actuator 1A is generated via this prefilter from a signal derived from the controller 73. As a result, the controller 73 only needs to output one kind of signal based on a signal from the vibration sensor 72.

Figure 10:
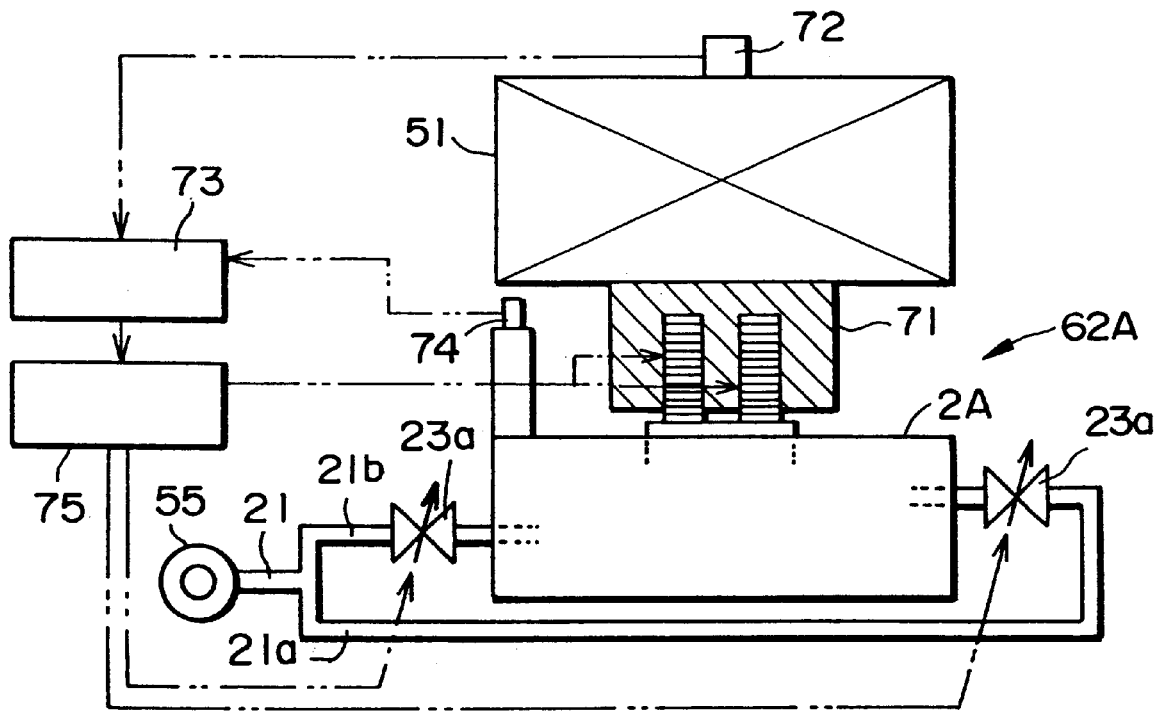
FIG. 10 shows an example of application of a hybrid actuator using the fluid actuator shown in FIG. 2.

FIG. 10 shows an application example of a hybrid actuator 62A using the fluid actuator 2A. In FIG. 10, parts in common to those shown in FIG. 9 are designated by the same reference numerals and their description is omitted.

This hybrid actuator 62A is the same as the hybrid actuator 61A, except that control valves 23a of the first fluid flow passage 21a and the second fluid flow passage 21b are controlled by the driver 75, thus allowing upward and downward bidirectional forces to positively act upon the driven member 51.

In the hybrid actuator 62A shown in FIG. 10, another fluid actuator of the second type may be applied instead of the fluid actuator 2A.

Further, in the application examples shown in FIGS. 7 to 10, an elastic member may be provided interveniently in series to the fluid actuator, where the order of arrangement of the elastic member and the fluid actuator is not limitative.

Figure 11:
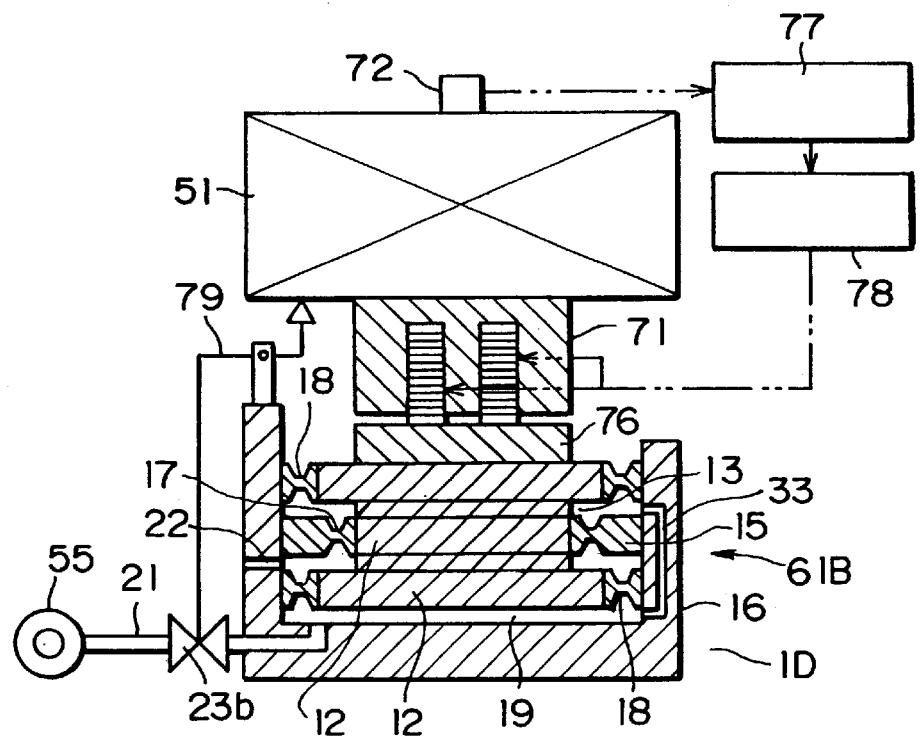
FIG. 11 shows an example of application of a hybrid actuator using a fluid actuator substantially identical with the fluid actuator shown in FIG. 1.

FIG. 11 shows an application example of a hybrid actuator 61B using a fluid actuator 1D which is substantially identical with the foregoing first embodiment. This hybrid actuator 61B comprises a fluid actuator 1D, an elastic member 76 and a vibration actuator 71 arranged in series to one another.

The fluid actuator 1D, like the fluid actuator 1A, comprises a cylinder casing 16, discs 12 disposed opposite to the bottom face of the cylinder casing 16, and a small seal member 17 and a large seal member 18 which support the discs 12 so as to be operable in such a manner that opposing faces of the cylinder casing 16 and the discs 12 go closer to or farther from each other, and which form closed spaces, i.e. small cavities 19, together with the cylinder casing 16 and the discs 12. In addition, a fluid flow passage 21 whose one end communicates with, for example, the lowermost small cavity 19 extends from the pressurized fluid supply source 55, and this fluid flow passage 21 has a control valve 23b provided thereon. Further, in this fluid actuator 1D, the small cavity 19 in the first-numbered stage and the small cavity 19 in the third-numbered stage communicate with each other by means of a through hole 33 formed in the cylinder casing 16. The small cavity 19 in the second-numbered stage communicates with the atmosphere via a through hole 22.

The elastic member 76 is made of, for example, elastomer, rubber, spring or the like, but not limited to these. The elastic member 76 may also be formed by combining different kinds of members or laminating those members.

The control valve 23b is a three-way switching valve of the mechanical drive type having a supply port, a control port and a discharge port similar to those of the control valve 23a. By this control valve 23b, the flow rate of the pressurized gas introduced from the pressurized fluid supply source 55 to the small cavities 19 as well as the flow rate of the gas discharged from the small cavities 19 are controlled. Then, if the control valve 23b is in the first state in which the supply flow rate of this pressurized gas is maximized, the discs 12 are actuated by the pressure of the pressurized gas introduced from the pressurized fluid supply source 55 to the small cavities 19 in such a direction that the aforementioned opposing surfaces are separated farther away. On the other hand, if the control valve 23b is in the second state in which the discharge flow rate of the pressurized gas is maximized, the gas in the small cavities 19 goes out, weakening the action of the gas pressure, so that the discs 12 are actuated in a direction opposite to that of the first state.

The driven member 51 is provided with a vibration sensor 72 for detecting vertical vibration state of the driven member 51. A detection signal showing a vibration state is inputted from this vibration sensor 72 to an actuator controller 77, and a control signal is fed from the actuator controller 77 to an actuator driver 78 based on the inputted detection signal, so that the vibration actuator 71 is driven by the actuator driver 78.

Further, a position sensing lever 79 is provided on the cylinder casing 16. One end of this position sensing lever 79 is in contact with the driven member 51 so as to operate up and down integrally therewith, thereby causing the valve body of the control valve 23b to move through an amount proportional to an amount of displacement of the driven member 51. Thus, the flow of gas at the control port is controlled.

The order of arrangement of the fluid actuator 1D, the elastic member 76 and the vibration actuator 71 is not limited, and the fluid actuator 1D or the elastic member 76 may be arranged in contact with the driven member 51.

In addition, the position sensing lever 79 may also be provided on the driven member 51 instead of the cylinder casing 16, so that relative displacement of the cylinder casing 16 to the driven member 51 is detected.

Figure 12:
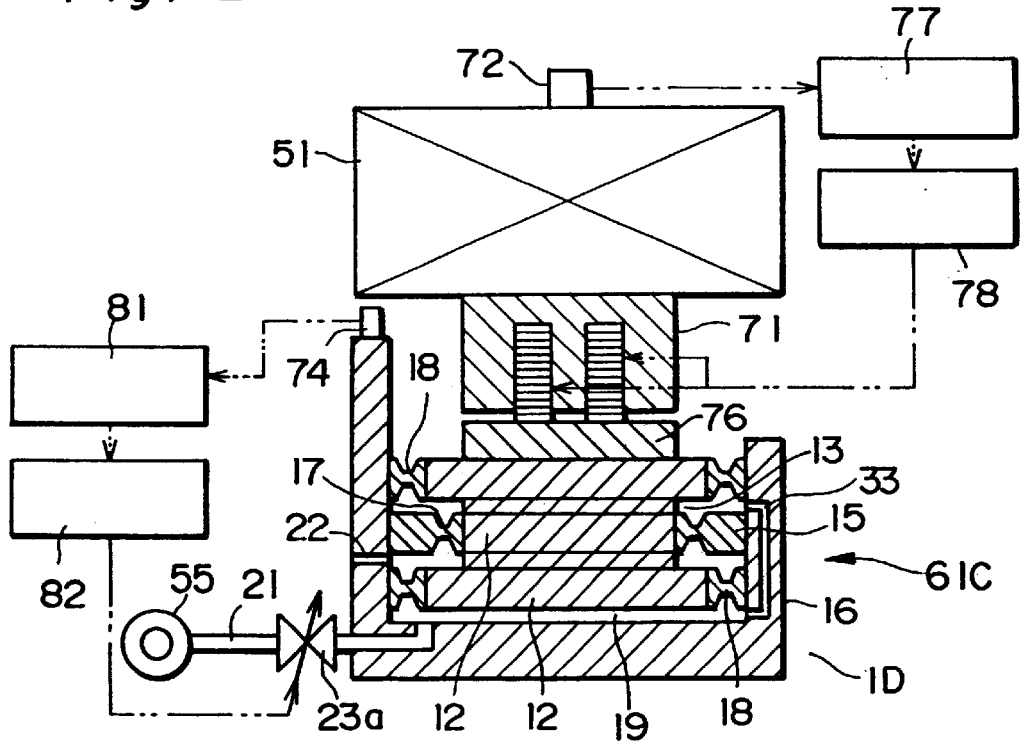
FIG. 12 shows an example of application of another hybrid actuator using the fluid actuator shown in FIG. 11.

FIG. 12 shows an application example of another hybrid actuator 61C using the fluid actuator 1D shown in FIG. 11, where parts common to the foregoing hybrid actuators are designated by the same reference numerals and the description is omitted.

This hybrid actuator 61C comprises the above-described control valve 23a which is an electromagnetic type three-way switching valve having a supply port, a control port and a discharge port, a displacement sensor 74 which is provided on the cylinder casing 16 and which detects vertical relative displacement of the driven member 51 with respect to the cylinder casing 16 in a non-contact manner, a valve controller 81 for, upon receiving an electric signal showing a displacement state from the displacement sensor 74, outputting a control signal based on the electric signal, and a valve driver 82 for actuating the control valve 23a upon receiving this control signal. Then, by this control valve 23a, the flow of air at the control port is controlled like the above case. Also, as in the above case, the displacement sensor 74 may be provided on the driven member 51 instead of the cylinder casing 16.

This hybrid actuator 61C is one in which the position control function of the fluid actuator 1D is positively enhanced as compared with the hybrid actuator 61B shown in FIG. 11. The hybrid actuator 61C is capable of measuring the position of the driven member 51, which is the object of control, by the displacement sensor 74, and driving the control valve 23a based on an error from a target position to fulfill feedback control of the position or to fulfill feedforward control thereof based on a target voltage, so that the position of the driven member 51 can be controlled. Then, with the above constitution, the hybrid actuator 61C becomes capable of achieving such large strokes and heavy control objects as could not be attained by the vibration actuator 71 alone. Meanwhile, the displacement sensor 74 is a non-contact type gap sensor, but without being limited to this, may be a displacement sensor of other types.

Figure 13:
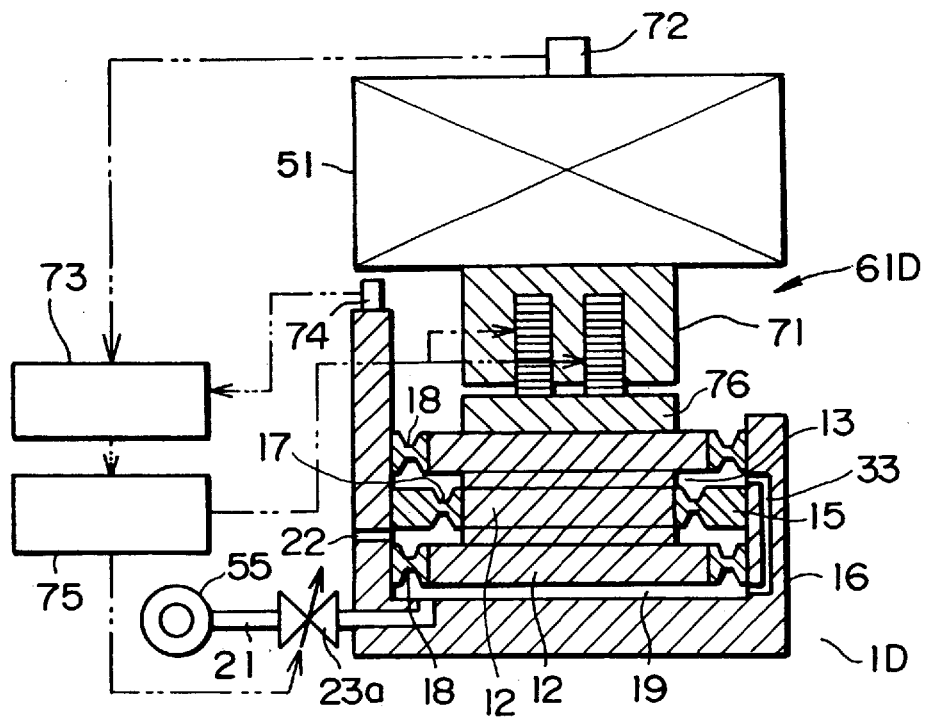
FIG. 13 shows an example of application of further another hybrid actuator using the fluid actuator shown in FIG. 11.

FIG. 13 shows an application example of another hybrid actuator 61D using the fluid actuator 1D shown in FIG. 11, where parts common to the foregoing fluid actuators are designated by the same reference numerals and their description is omitted.

In this hybrid actuator 61D, detection signals by the vibration sensor 72, and the displacement sensor 74 are inputted to the controller 73, and based on these detection signals, the vibration actuator 71 and the control valve 23a are controlled via the driver 75 by the controller 73.

Figure 14:
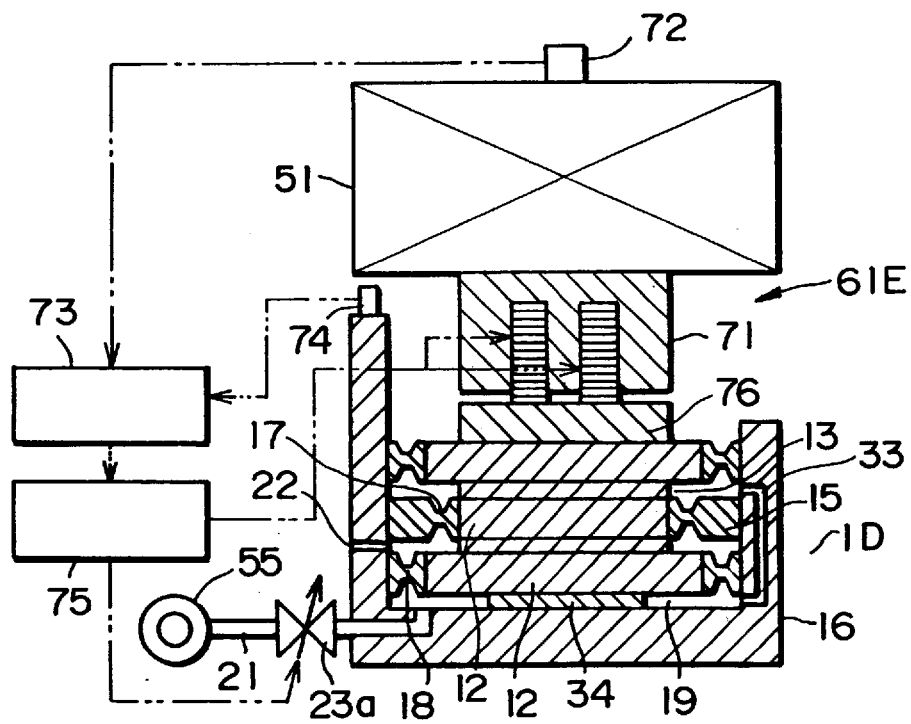
FIG. 14 shows an example of application of still further another hybrid actuator using the fluid actuator shown in FIG. 11.

FIG. 14 shows an application example of another hybrid actuator 61E using the fluid actuator 1D shown in FIG. 11, where parts common to the foregoing fluid actuators are designated by the same reference numerals and their description is omitted.

In this hybrid actuator 61E, an elastic member 34 is provided between the cylinder casing 16 of the fluid actuator 1D and the lowermost disc 12 in the same manner as the embodiments shown in FIGS. 5 and 6.

Thus, by incorporating the elastic member 34 into the fluid actuator 1D in parallel to the fluid actuator 1D, i.e., in such a way that the drive by the fluid actuator 1D is restricted, it become possible to support the vibration actuator 71 with a spring constant larger than that of the fluid actuator 1D alone.

In the case of a conventional vertical actuator for vibration removing which is so designed that all loads are supported by the vibration actuator and the elastic member, it could be assumed that the elastic member such as elastomer would wear out by long-term support, being plastically deformed, so that the driven member would be changed in position. On the other hand, the hybrid actuator 61E is capable of strictly maintaining the position of the driven member by compensating the amount of plastic deformation of the elastic member 34 with the pressure of the fluid actuator 1D, and besides the hybrid actuator 61E can easily compensate fluctuations of loads.

Needless to say, the internal pressure of the fluid actuator 1D is controlled and used for vibration suppression, as in the case of the hybrid actuator 61D. However, the effective pressure-receiving area of the hybrid actuator 61E is reduced and, the internal pressure of the fluid actuator 1D is lowered due to reduction of the load shared by the fluid actuator 1D by the elastic member 34 disposed in the hybrid actuator 61E, thus resulting in smaller control force.

Meanwhile, in the hybrid actuators shown in FIGS. 9 to 14, it is preferable that the thickness of the small cavities 19 of the fluid actuator be several tens to hundreds $\mu$m, thereby increasing the spring constant of the fluid actuator.

Figure 15:
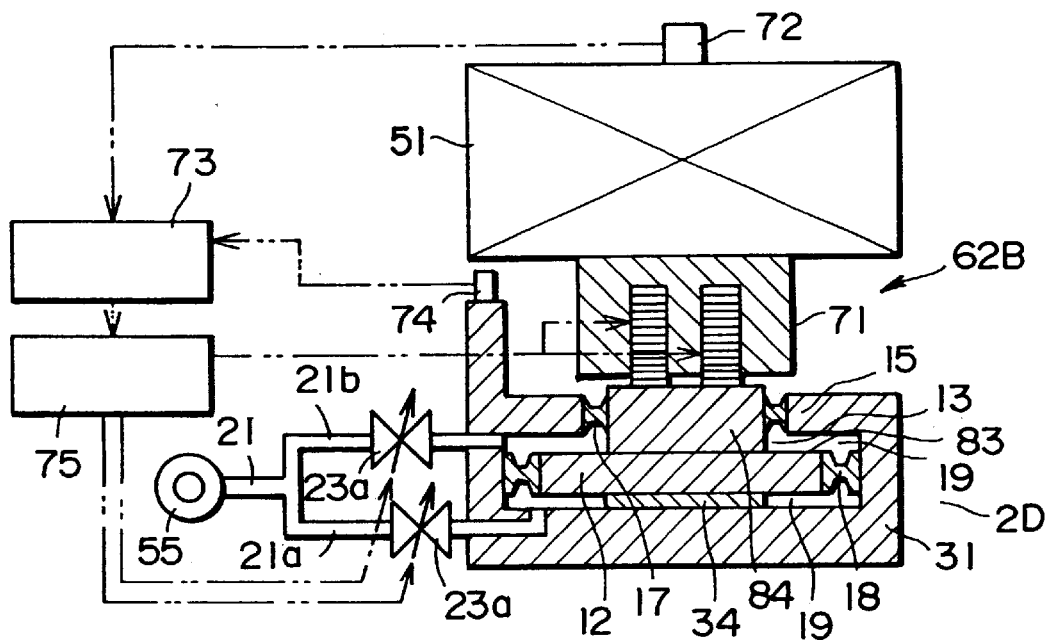
FIG. 15 shows an example of application of a hybrid actuator using a fluid actuator analogous to the fluid actuator shown in FIG. 3.

FIG. 15 shows an application example of a hybrid actuator 62B using a fluid actuator 2D substantially identical with the foregoing third embodiment except for the number of the small cavities 19, where parts common to the foregoing hybrid actuators are designated by the same reference numerals and their description is omitted.

This hybrid actuator 62B comprises a fluid actuator 2D and a vibration actuator 71 arranged in series. An annular protrusion 15 is formed inside an upper end portion of the fluid actuator 2D, and the fluid actuator 2D is so formed as to have a portion, that is, a projecting portion 84 in the illustrated example, which is exposed from a central portion of upper pressure-receiving surface 83 that receives a force oppositely directed to the force received from the small cavity 19 under the disc 12, to the space above the annular protrusion 15 via the small seal member 17. Meanwhile, this exposed portion does not necessarily need to be projecting from the upper pressure-receiving surface 83, and may be a part of the flat top surface of the upper pressure-receiving surface 83.

The fluid flow passage 21 is branched into a first fluid flow passage 21a and a second fluid flow passage 21b, and the first fluid flow passage 21a and the second fluid flow passage 21b communicate with small cavities 19 via control valves 23a, respectively, independently of each other.

Further, detection signals outputted from the vibration sensor 72 and the displacement sensor 74 are inputted to the controller 73, and based on these detection signals, the vibration actuator 71 and the two control valves 23a are controlled via the driver 75 by the controller 77. Accordingly, internal pressures of the two small cavities 19 are controlled independently of each other.

This hybrid actuator 62B is designed so as to be able to solve the problem of reduced driving force of the hybrid actuator 61E and to set apart the issues of position control and vibration control from each other. Since the small cavity 19 in the first-numbered stage and the space 19 in the second-numbered stage serving as opposing drivers of the fluid actuator 2D are formed independently of each other, pressure difference between the small cavities contributes to positional change, making it possible to infinitely reduce the share of load due to the fluid pressure within the fluid actuator 2D. That is, load is imposed on the elastic member 34 so that the disc 12 receives equal force at upper and lower surfaces from the fluid, by which load imposed on the fluid actuator 2D can be eliminated. Therefore, the positional change of the driven member 51 between a case in which the fluid pressure is naught and another case in which the fluid pressure is applied can be made infinitely close to zero. As a result, in applications for vibration removing, there can be obtained an advantage that the load condition of the fluid actuator 2D does not change between its de-energization and its energization.

Figure 16:
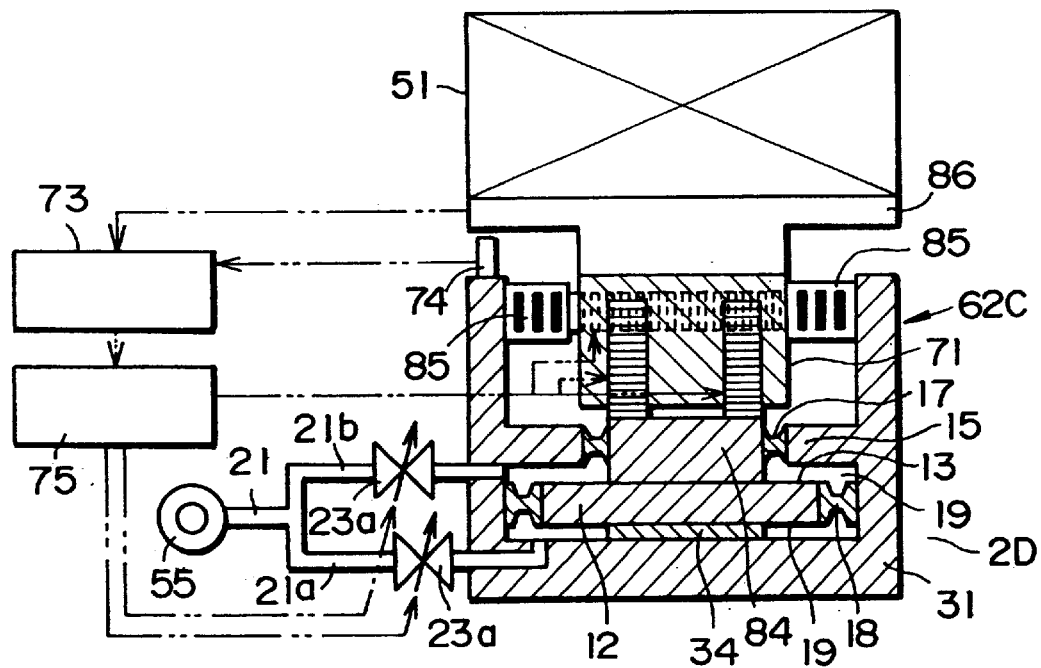
FIG. 16 shows an example of application of another hybrid actuator using the fluid actuator shown in FIG. 15.

FIG. 16 shows an application example of a further hybrid actuator 62C using the fluid actuator 2D shown in FIG. 15, where parts common to the foregoing fluid actuators are designated by the same reference numerals and their description is omitted.

In this hybrid actuator 62C, the vibration actuator 71 has a solid element or linear motor that operates laterally, and is pressed from opposite sides by two elastic members 85 disposed on opposite sides at all times. Also, in the example shown in FIG. 16, between the driven member 51 and the vibration actuator 71, a sensor unit 86 is interveniently provided which comprises a vibration sensor for detecting vertical vibration state, a vibration sensor for detecting horizontal vibration state. Furthermore, the sensor unit 86 may be a displacement sensor for detecting horizontal displacement in accordance with control content.

Thus, detection signals from the each sensor are inputted to the controller 73 and, based on these detection signals, the vibration actuator 71 and the two control valves 23a are controlled from the controller 73 via the driver 75. In addition, in this case, the solid element that operates vertically and the solid element or linear motor that operates horizontally in the vibration actuator 71 are controlled independently of each other.

Meanwhile, the aforementioned fluid actuator may be used instead of the elastic members 85 so as to allow the drive in directions of X-axis and Y-axis, which are perpendicular to each other, and further in a direction of Z-axis.

Figure 17:
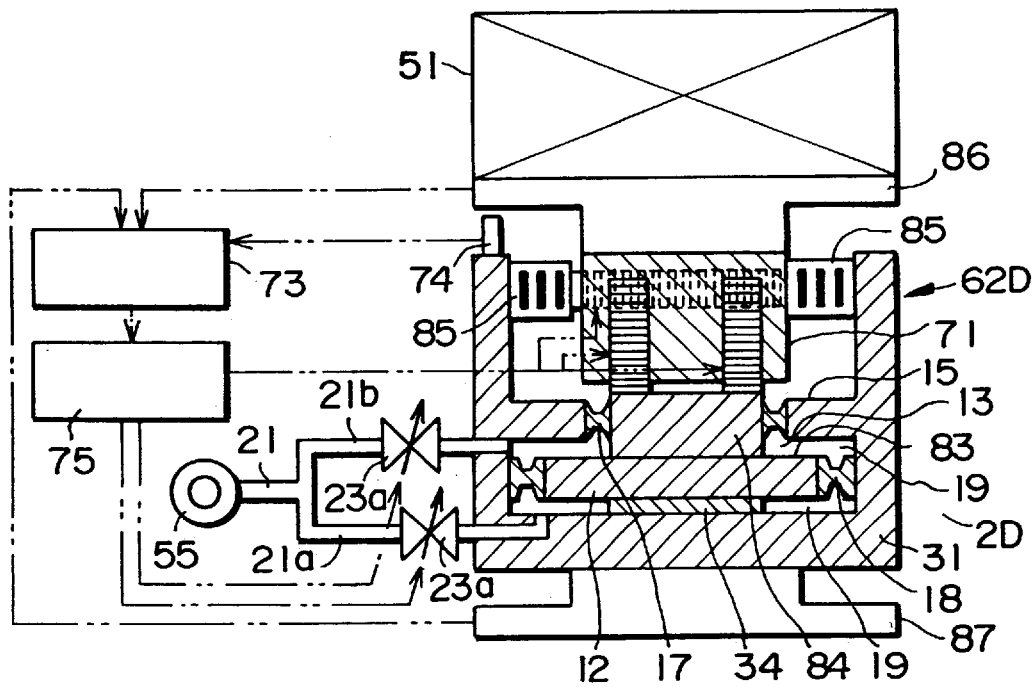
FIG. 17 shows an example of application of further another hybrid actuator using the fluid actuator shown in FIG. 15.

FIG. 17 shows an application example of another hybrid actuator 62D using the foregoing fluid actuator 2D, where parts common to the foregoing fluid actuator are designated by the same reference numerals and their description is omitted.

In this hybrid actuator 62D, a ground motion sensor unit 87 for detecting vertical vibration of the installation site of the hybrid actuator 62D, for example, the floor surface is provided interveniently between the installation site and the fluid actuator 2D, so that a ground motion signal detected by this ground motion sensor unit 87 is inputted to the controller 73 and that the vibration actuator 71 and the two control valves 23a are controlled via the driver 75 based on signals from the displacement sensor 74, the sensor unit 86 and the ground motion sensor unit 87.

Figure 18:
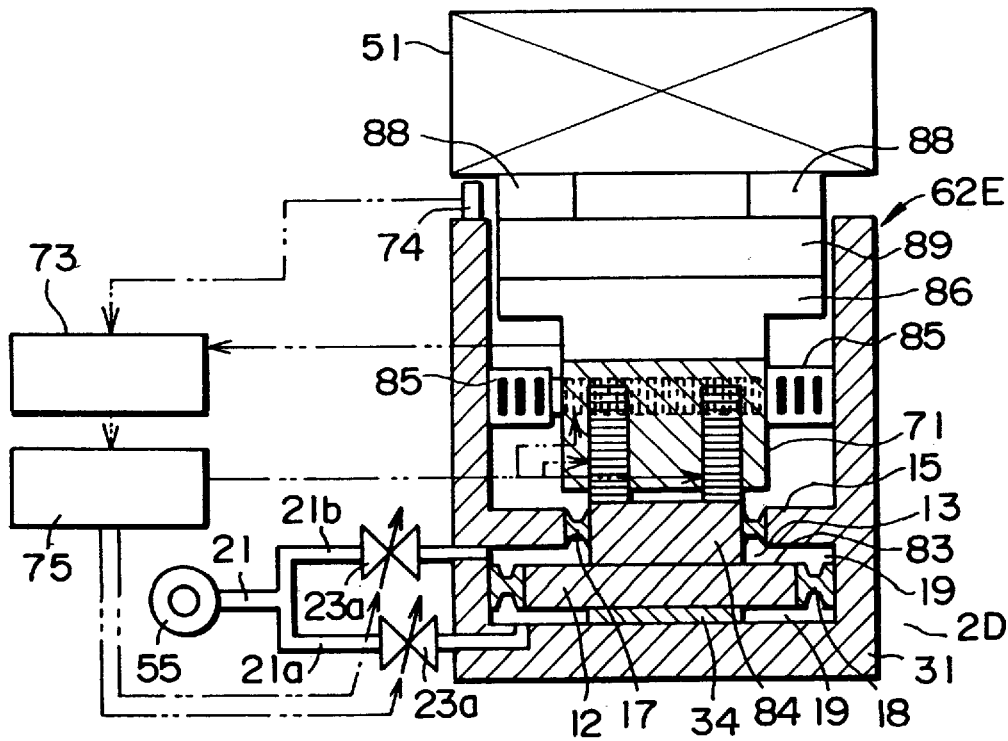
FIG. 18 shows an example of application of still further another hybrid actuator using the fluid actuator shown in FIG. 15.

FIG. 18 shows an application example of another hybrid actuator 62E using the fluid actuator 2D shown in FIG. 15, where parts common to the foregoing hybrid actuator are designated by the same reference numerals and their description is omitted.

In this hybrid actuator 62E, an elastic support member 88 and an additional mass 89 arranged in series are provided interveniently between the vibration actuator 71 and the driven member 51. Thus, detection signals by the displacement sensor 74 and various sensors accommodated in the sensor unit 86 are inputted to the controller 73, and based on these signals, the vibration actuator 71 and the two control valve 23a are controlled via the driver 75.

This hybrid actuator 62E is an application to a double vibration-proofing system. By virtue of using the additional mass 89, the hybrid actuator 62E is improved in vibration isolation characteristic of high frequency region without yielding resonance points in low frequency region.

The present invention also includes hybrid actuators in which the vibration actuator is placed below and the fluid actuator is placed above the vibration actuator.

Also, the above-described elastic member 34 does not necessarily need to be provided.

Next, a fluid actuator of a third type which has upper and lower portions of the core exposed and which is connected to one kind of fluid flow passage, as well as a fluid actuator of a fourth type in which upper and lower portions of the core are exposed and which is connected to two kinds of fluid flow passages are described.

Figure 19:
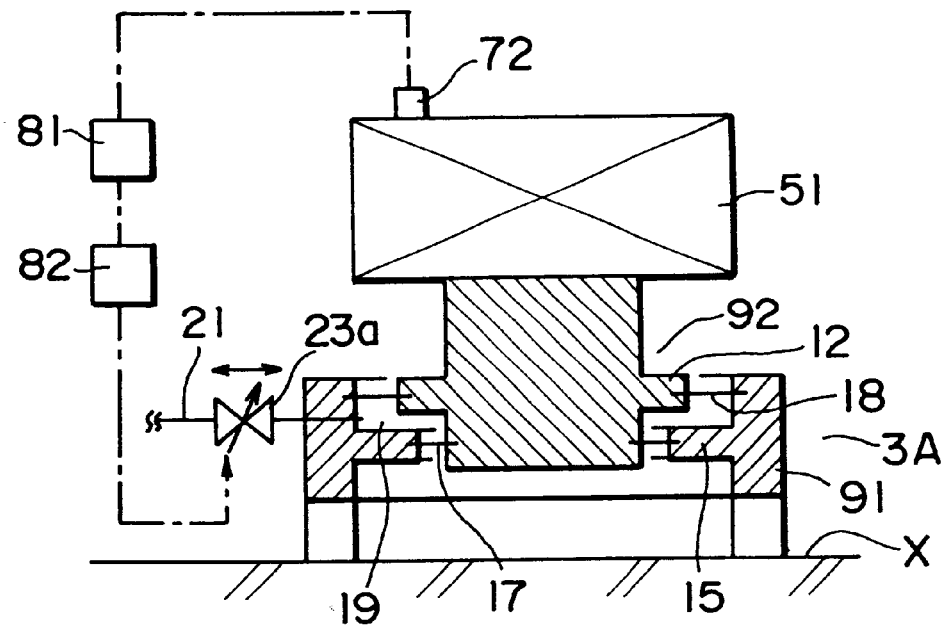
FIG. 19 shows an example of application of a hybrid actuator using a fluid actuator according to a seventh embodiment of the present invention.

FIG. 19 shows a fluid actuator 3A according to a seventh embodiment of the invention as well as an application example thereof, where parts common to the foregoing fluid actuators are designated by the same reference numerals and their description is omitted.

This fluid actuator 3A comprises a cylinder casing 91 opened at upper and lower portions and placed on a support portion X, and a core 92 placed inside the cylinder casing 91 and supporting a driven member 51.

A single annular protrusion 15 is projecting laterally at inner periphery of the cylinder casing 91, and a single disc 12 is projecting laterally at outer periphery of the core 92. A small seal member 17 is interposed between the annular protrusion 15 and the core 92 without interfering with upward and downward relative movement of these two members, and a large seal member 18 is interposed between the disc 12 and the inner periphery of the cylinder casing 91.

A small cavity 19 is formed between the small seal member 17 and the large seal member 18 so that the effective pressure-receiving area of this small cavity 19 on the large seal member 18 side is larger than its effective pressure-receiving area on the small seal member 17 side. In addition, a fluid flow passage 21 having a control valve 23a interveniently provided thereon is connected to the cylinder casing 91, so that a pressurized fluid, for example, a gas is supplied to the small cavity 19 while gas within the small cavity 19 is discharged.

For the small seal member 17 and large seal member 18, for example, diaphragms comprising annular thin plates or O-rings are used as in the above case.

To the driven member 51 on the core 92 is attached a vibration sensor 72 for detecting vibration state of the driven member 51. A detection signal showing the vibration state by the vibration sensor 72 is outputted to a valve controller 81, and a control signal is outputted from this valve controller 81 to a valve driver 82 that actuates the control valve 23a.

Figure 20:
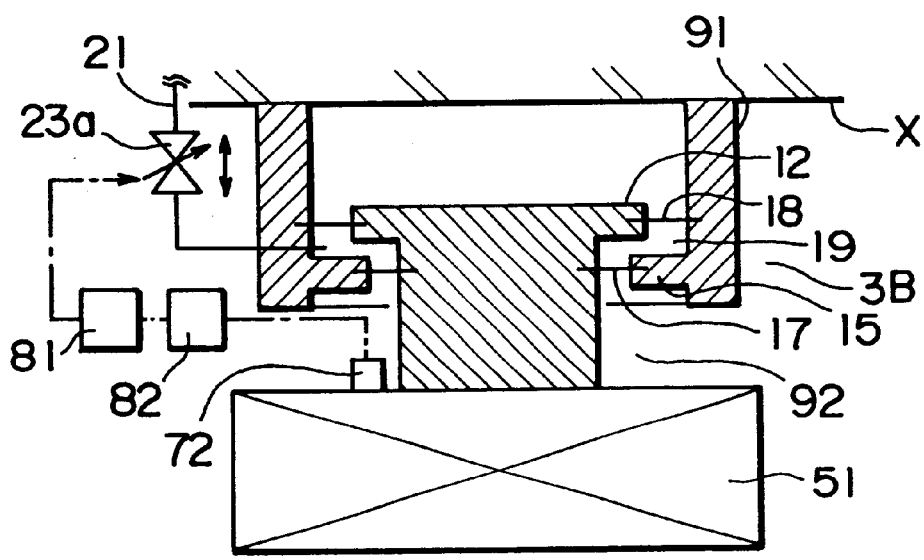
FIG. 20 shows an example of application of a hybrid actuator using a fluid actuator according to an eighth embodiment of the present invention.

FIG. 20 shows a fluid actuator 3B according to an eighth embodiment of the invention as well as an application example thereof, where parts common to the foregoing fluid actuator are designated by the same reference numerals and their description is omitted.

In this fluid actuator 3B, the cylinder casing 91 of the fluid actuator 3B is fixed to a support portion X located above, and the driven member 51 is hung down on a lower end of the core 92.

Figure 21:
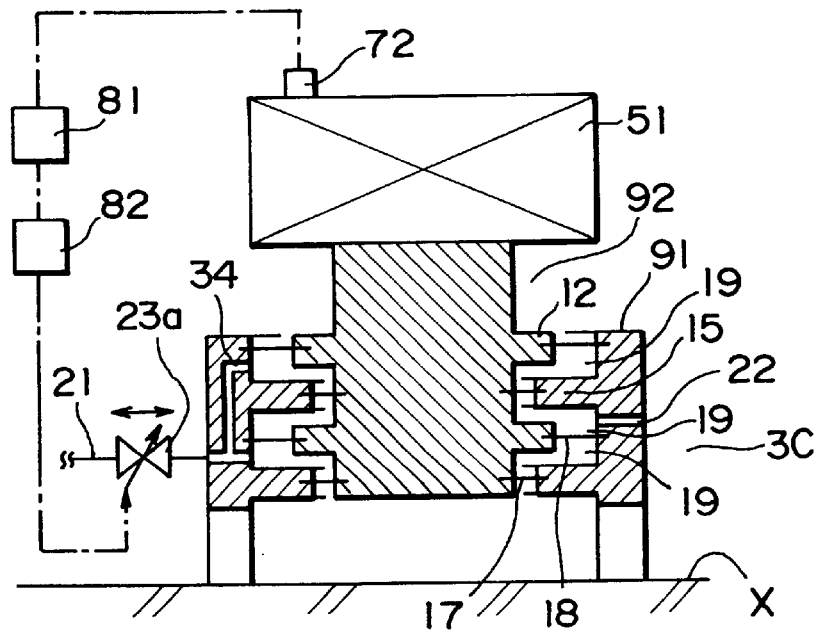
FIG. 21 shows an example of application of a hybrid actuator using a fluid actuator according to a ninth embodiment of the present invention.

FIG. 21 shows a fluid actuator 3C according to a ninth embodiment of the invention as well as an application example thereof, where parts common to the foregoing fluid actuators are designated by the same reference numerals and their description is omitted.

In this fluid actuator 3C, a small cavity 19 communicating with the atmosphere by means of a through hole 22 is provided between the two small cavities 19. The two small cavities 19 communicate with each other by means of a through hole 34 connected to the fluid flow passage 21.

Figure 22:
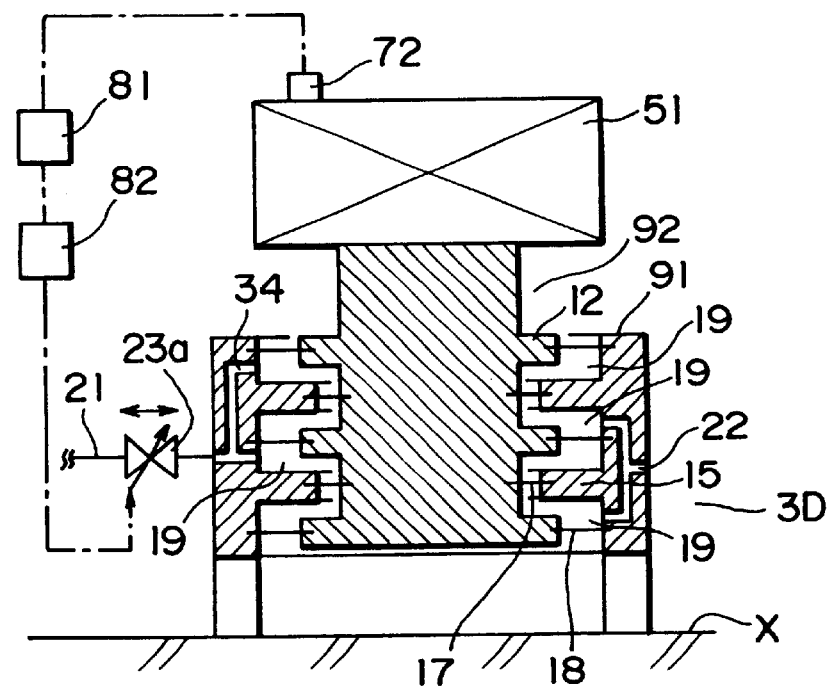
FIG. 22 shows an example of application of a hybrid actuator using a fluid actuator according to a tenth embodiment of the present invention.

FIG. 22 shows a fluid actuator 3D according to a tenth embodiment of the invention as well as an application example thereof, where parts common to the foregoing fluid actuators are designated by the reference numerals and their description is omitted.

This fluid actuator 3D has the small cavities 19 in first-numbered stage and third-numbered stage communicating with each other by means of a through hole 22, and the small cavities 19 in second-numbered stage and fourth-numbered stage communicating with each other by means of a through hole 34. The through hole 22 communicates with the atmosphere, and the through hole 34 is connected to the fluid flow passage 21.

Figure 23:
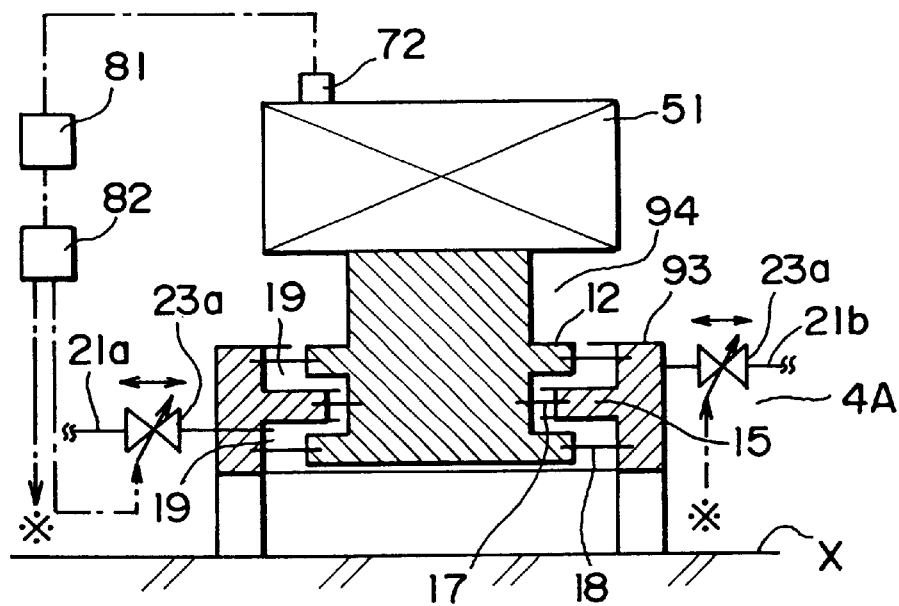
FIG. 23 shows an example of application of a hybrid actuator using a fluid actuator according to an eleventh embodiment of the present invention.

FIG. 23 shows a fluid actuator 4A according to an eleventh embodiment of the invention as well as an application example thereof, where parts common to the foregoing fluid actuators are designated by the same reference numerals and their description is omitted.

This fluid actuator 4A has a small seal member 17 between an annular protrusion 15 and a core 94 within a cylinder casing 93 opened at upper and lower portions, as well as a large seal member 18 between a disc 12 projected from the core 94 and the inner periphery of the cylinder casing 93. Further, two small cavities 19 are formed above and below the small seal member 17, one of the small cavities 19 communicating with a first fluid flow passage 21a and the other communicating with a second fluid flow passage 21b.

Figure 24:
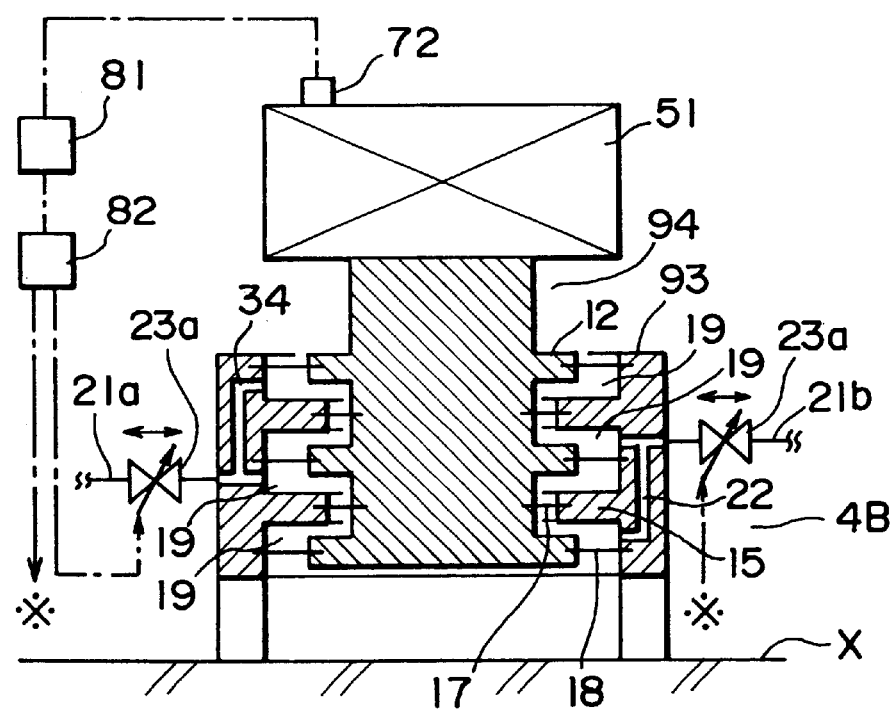
FIG. 24 shows an example of application of a hybrid actuator using a fluid actuator according to a twelfth embodiment of the present invention.

FIG. 24 shows a fluid actuator 4B according to a twelfth embodiment of the invention as well as an application example thereof, where parts common to the foregoing fluid actuators are designated by the same reference numerals and their description is omitted.

This fluid actuator 4B has the small cavities 19 in first-numbered stage and third-numbered stage communicating with each other by means of a through hole 22, and the small cavities 19 in second-numbered stage and fourth-numbered stage communicating with each other by means of a through hole 34. The through hole 34 is connected to the first fluid flow passage 21a and the through hole 22 is connected to the second fluid flow passage 21b.

In the application examples of the fluid actuators shown in FIGS. 19 to 24, an elastic member may be interveniently provided above or below the core 92 or 94, and an elastic member may be interveniently provided below the cylinder casing 91 or 93.

Figure 25:
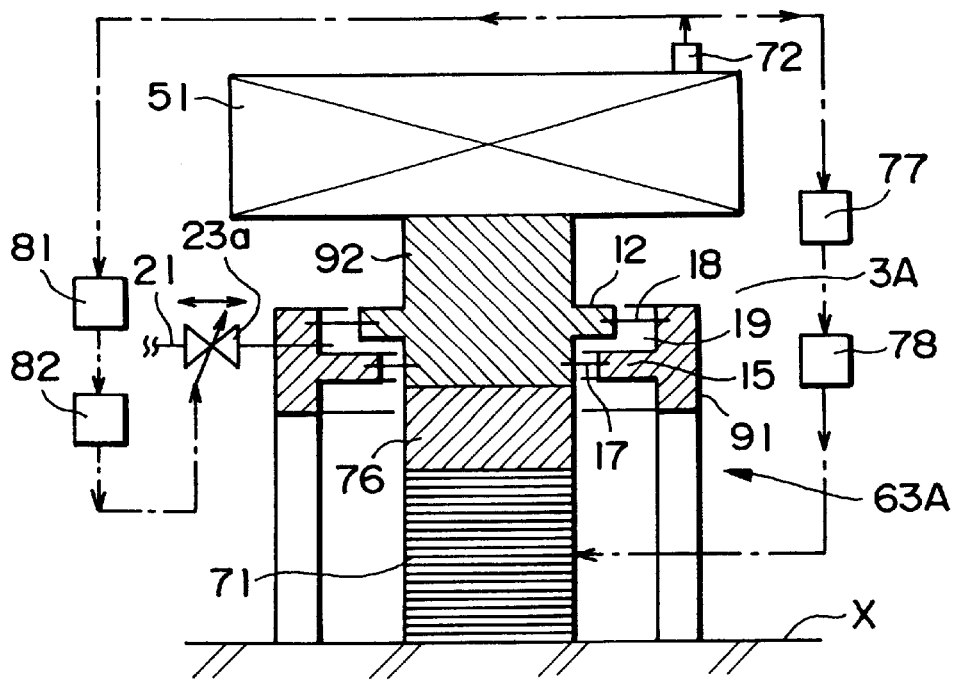
FIG. 25 shows an example of application of a hybrid actuator using the fluid actuator shown in FIG. 19.

FIG. 25 shows a hybrid actuator 63A using the fluid actuator 3A as well as an application example thereof, where parts common to the foregoing embodiments are designated by the same reference numerals and their description is omitted.

This hybrid actuator 63A generally comprises the core 92 of the fluid actuator 3A, the vibration actuator 71 and the elastic member 76 arranged in series, where the cylinder casing 91 and the vibration actuator 71 are supported on a support portion X.

To the driven member 51 placed on the core 92 of the fluid actuator 3A is attached a vibration sensor 72 for detecting vibration state of the driven member 51. A detection signal showing the vibration state by the vibration sensor 72 is inputted to a valve controller 81, and a control signal is outputted from this valve controller 81 to a valve driver 82 that actuates the control valve 23a. A detection signal from the vibration sensor 72 is inputted also to the actuator controller 77, from which a control signal is sent to the actuator driver 78, so that the vibration actuator 71 is driven up and down by the actuator driver 78.

Meanwhile, in the case where this hybrid actuator 63A is used upside down with respect to the state of the FIG. 25, i.e., where the support portion X is located above while the fluid actuator 3A and the vibration actuator 71 are hung down on the support portion X, the disc 12 and the annular protrusion 15 has to be formed in such a way that the large seal member 18 is located above while the small seal member 17 is located below in order that upward force acts on the core 92.

Figure 26:
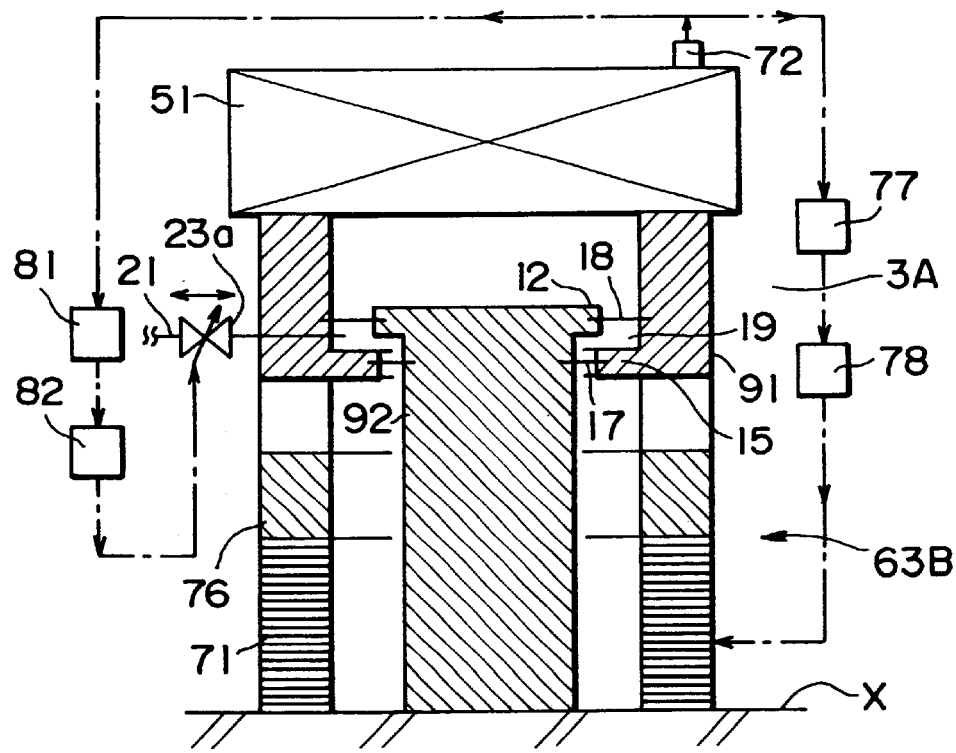
FIG. 26 shows an example of application of another hybrid actuator using the fluid actuator shown in FIG. 19.

FIG. 26 shows a hybrid actuator 63B using the fluid actuator 3A as well as an application example thereof, where parts common to the foregoing embodiments are designated by the same reference numerals and their description is omitted.

This hybrid actuator 63B generally comprises the cylinder casing 91 of the fluid actuator 3A, the vibration actuator 71 and the elastic member 76 arranged in series, where the core 92 and the vibration actuator 71 are supported on a support portion X.

The vibration actuator 71 and the elastic member 76 are, preferably, shaped cylindrically, but not limited to the shape.

Figure 27:
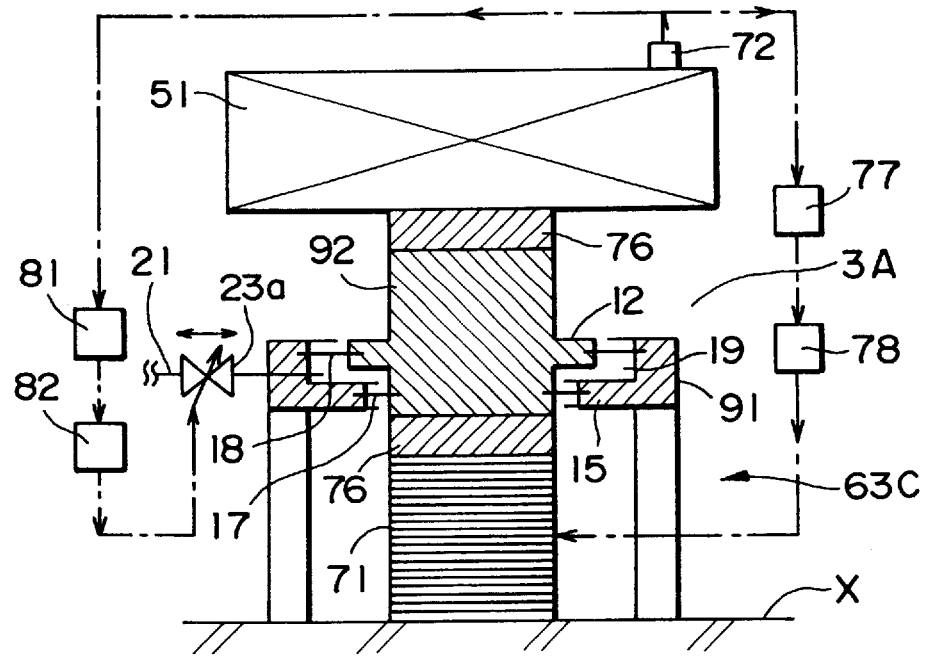
FIG. 27 shows an example of application of a further hybrid actuator using the fluid actuator shown in FIG. 19.

FIG. 27 shows a hybrid actuator 63C using the fluid actuator 3A as well as an application example thereof, where parts common to the foregoing embodiments are designated by the same reference numerals and their description is omitted.

This hybrid actuator 63C generally comprises the core 92 of the fluid actuator 3A, the vibration actuator 71 and the elastic member 76 arranged in series, where the cylinder casing 91 and the vibration actuator 71 are supported on a support portion X.

Thus, the elastic member 76 does not necessarily need to be provided at one place, and may be provided at a plurality of places, and besides the elastic member 76 may be provided interveniently between the support portion X and the vibration actuator 71.

Figure 28:
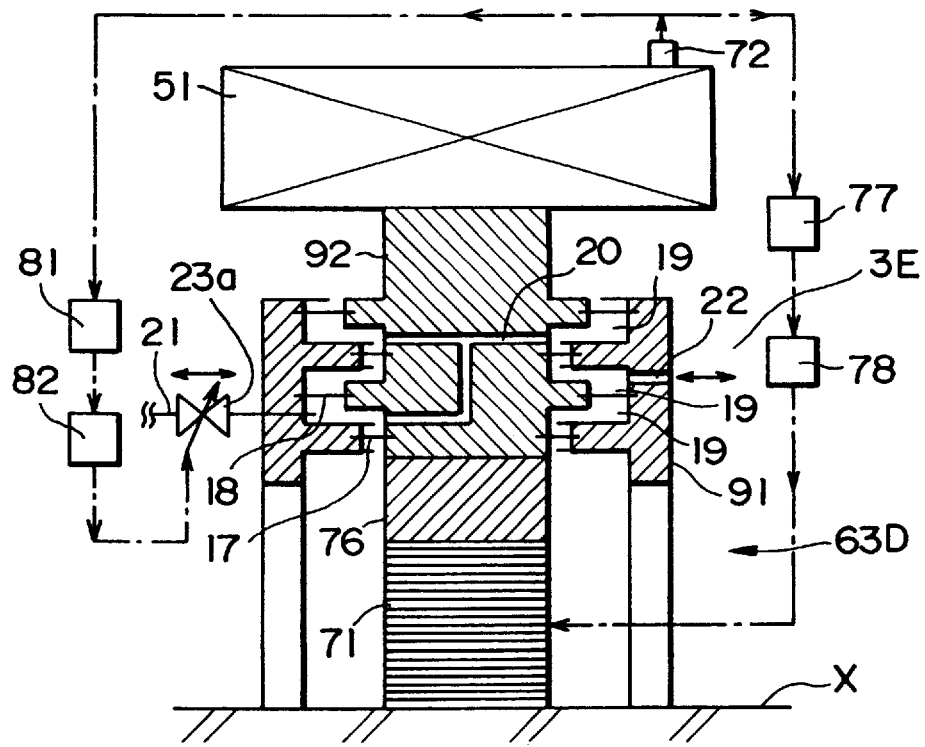
FIG. 28 shows an example of application of a hybrid actuator using a fluid actuator according to a thirteenth embodiment of the present invention.

FIG. 28 shows a fluid actuator 3E according to a thirteenth embodiment of the invention as well as an application example of a hybrid actuator 63D using the fluid actuator 3E, where parts common to the foregoing embodiments are designated by the same reference numerals and their description is omitted.

This hybrid actuator 63D generally comprises the core 92 of the fluid actuator 3E, the elastic member 76 and the vibration actuator 71 arranged in series, where the cylinder casing 91 and the vibration actuator 71 are supported on a support portion X.

The fluid actuator 3E has the small cavities 19 in first-numbered stage and third-numbered stage communicating with each other by means of a through hole 20 formed in the core 92, and the small cavity 19 in second-numbered stage communicating with the atmosphere by means of a through hole 22 formed in the cylinder casing 91. The small cavity 19 in first-numbered stage communicates also with the fluid flow passage 21.

Figure 29:
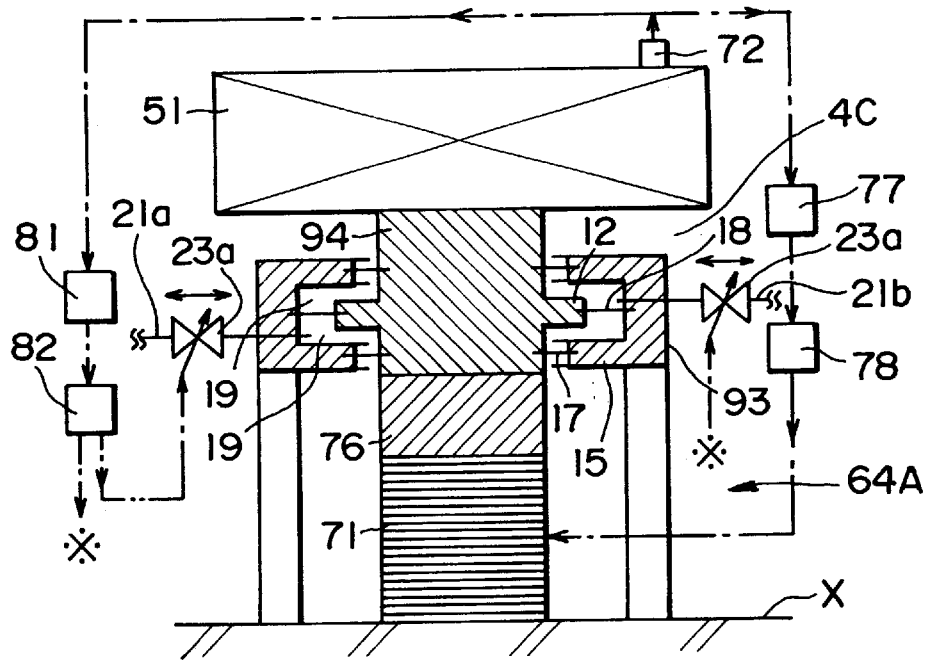
FIG. 29 shows an example of application of a hybrid actuator using a fluid actuator according to a fourteenth embodiment of the present invention.

FIG. 29 shows a fluid actuator 4C according to a fourteenth embodiment of the invention as well as an application example of a hybrid actuator 64A using the fluid actuator 4C, where parts common to the foregoing embodiments are designated by the same reference numerals and their description is omitted.

This hybrid actuator 64A generally comprises the core 94 of the fluid actuator 4C, the elastic member 76 and the vibration actuator 71 arranged in series, where the cylinder casing 93 and the vibration actuator 71 are supported on a support portion X.

The fluid actuator 4C has two small cavities 19, one communicating with the first fluid flow passage 21a and the other communicating with the second fluid flow passage 21b.

Figure 30:
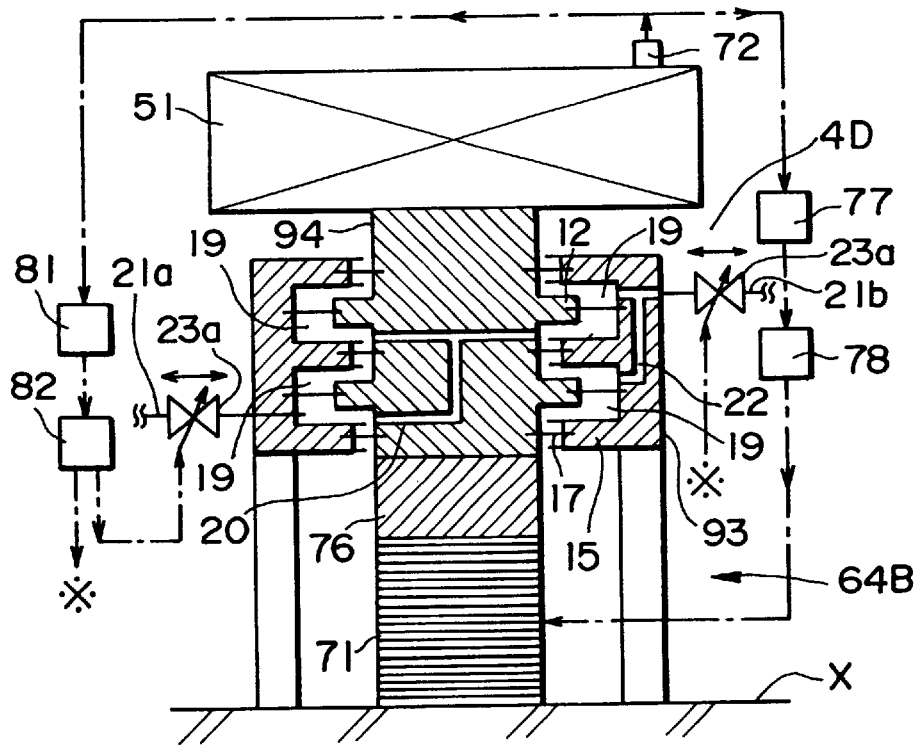
FIG. 30 shows an example of application of a hybrid actuator using a fluid actuator according to a fifteenth embodiment of the present invention.

FIG. 30 shows a fluid actuator 4D according to a fifteenth embodiment of the invention as well as an application example of a hybrid actuator 64B using the fluid actuator 4D, where parts common to the foregoing embodiments are designated by the same reference numerals and their description is omitted.

This hybrid actuator 64A generally comprises the core 92 of the fluid actuator 4D, the elastic member 76 and the vibration actuator 71 arranged in series, where the cylinder casing 93 and the vibration actuator 71 are supported on a support portion X.

The fluid actuator 4D has the small cavities 19 in first-numbered stage and third-numbered stage communicating with each other by means of a through hole 20, and the small cavities 19 in second-numbered stage and fourth-numbered stage communicating with each other by means of a through hole 22. The through hole 20 is connected to the first fluid flow passage 21a and the through hole 22 is connected to the second fluid flow passage 21b.

In the application examples of the hybrid actuators shown in FIGS. 25 to 30, the elastic member may be interveniently provided above below the core 92, 94, and the elastic member may also be interveniently provided below the cylinder casing 91, 93.

Whereas the vertical direction herein refers to a direction on the accompanying drawings, it is needless to say that the above-described fluid actuators and hybrid actuators may be placed so that force is generated in one direction only, or that force is generated in directions of X- and Y-axes perpendicular to each other, and besides in a direction of Z-axis. Accordingly, the above-described fluid actuators and hybrid actuators may be placed horizontally so that not only vertical but also horizontal forces are generated, so that forces act in directions of two-axes or three-axes, by which the driven member can be controlled, for example, for position control or vibration control.

In the fluid actuators as described above, preferably, a plurality of supply ports for pressurized gas to the small cavities 19 are provided uniformly over the small cavities 19 in order that the pressurized gas is supplied generally uniformly from the fluid flow passage 21, the first fluid flow passage 21a and the second fluid flow passage 21b to the small cavities 19 directly communicating with these fluid flow passages, respectively.

Preferably, a reserve tank for storing pressurized gas is provided at a portion of the fluid flow passage 21 or portions of the first fluid flow passage 21a and the second fluid flow passage 21b between the control valves 23, 23a, 23b and the small cavities 19 or on a flow passage communicating with the small cavities 19, so that the static spring constant of the fluid actuators becomes small. Further preferably, throttle means, for example, an orifice is provided at the aforementioned portion of the fluid flow passage 21, the first fluid flow passage 21a and the second fluid flow passage 21b or on the flow passage that allow the small cavities 19 and the reserve tank communicated with each other.

In the present invention, the number of small cavities 19 is not limited, and it is only required that the same kind of small cavities 19 are not placed in adjacency, that is, different kinds of small cavities 19 are arranged alternately.

The cylinder casing 16, 31, the annular protrusion 15 and the discs 12 are each made of a member having enough rigidity for the discs 12 to be actuated in such a direction as to go apart from the annular protrusion 15 when the pressurized gas is introduced into the small cavities 19.

The cylinder casing 16, 31 does do not necessarily need to be constant in inner diameter, and may also be formed into, for example, a truncated conical shape. Furthermore, the disc 12 and the annular protrusion 15 in each stages also do not need to be constant in inner diameter or outer diameter.

In the present invention, the order of placement of the fluid actuator, the vibration actuator and the elastic member as described above is not limitative, and the elastic member is not necessarily required. On the contrary, a plurality of elastic members may be provided.

The core of the fluid actuator may be a hollow body.

As described hereinabove, the present invention allows applications to high loads with small space.

What is claimed is:

1. A fluid actuator comprising:

a single core having a plurality of discs protruding around an output shaft;

a cylinder casing which has a body hollow configuration with an opening provided at its upper portion, and which receives the core in the hollow body in a state where not only an upper end of the output shaft is projected out of the opening but a lower portion of the core is set free, and which has an annular protrusion projecting into an air gap between the discs;

at least one friction-less, annular small diaphragm interposed between a portion of the core located between the discs and the annular protrusion so as to allow their relative movement in upward and downward directions and so as to divide a space between the portion of the core and the annular protrusion into upper and lower portions; and a plurality of friction-less, annular large diaphragms each interposed between an inner peripheral surface of the cylinder casing and outer periphery portion of the disc so as to allow their relative movement in upward and downward directions and so as to allow their relative movement in upward and downward directions and so as to divide a space between the inner peripheral surface of the cylinder casing and the outer periphery portion of the disc into upper and lower portions; wherein a plurality of small cavities are each interposed between neighboring ones of the small diaphragm and the large diaphragms or between the lowest large diaphragm and a bottom portion of the cylinder casing so as to be arrayed in an axial direction of the core, a first group of the small cavities in even-numbered stages counted from the bottom communicate with the atmosphere and a second group of the cavities communicate with one another, at least one small-cavity of the second group communicates with a fluid flow passage for supplying and discharging pressurized fluid, and an effective pressure-receiving area on the large diaphragm side is larger than an effective pressure-receiving area on the small diaphragm side in each of the small cavities.

2. A hybrid actuator comprising:

the fluid actuator described in claim 1; and a vibration actuator which is connected to the fluid actuator in series.

3. A hybrid actuator comprising:

the fluid actuator described in claim 1;

a vibration actuator; and an elastic member which is connected to the fluid actuator and the vibration actuator to one another in series.

4. A fluid actuator comprising:

a single core having a plurality of discs protruding around an output shaft;

a cylinder casing which has a body of hollow configuration with an opening provided at its upper portion, and which receives the core in the hollow body in a state where not only an upper end of the output shaft is projected out of the opening but a lower portion of the core is set free, and which has an annular protrusion projecting into an air gap between the discs;

at least one friction-less, annular small diaphragm interposed between a position of the core located between the discs and the annular protrusion so as to allow their relative movement in an upward and downward directions and so as to divide a space between the portion of the core and the annular protrusion into upper and lower sides; and at least one friction-less, annular large diaphragm which is interposed in alternate relation with the small diaphragm between the core and the cylinder casing and does not interfere with upward and downward relative movement of the core and the cylinder casing and has an effective pressure-receiving area larger than that of the small diaphragm;

a first fluid flow passage for supplying pressurized fluid to at least one small cavity interposed between neighboring ones of the small diaphragm and the large diaphragm or between the lowest large diaphragm and a bottom portion of the cylinder casing in an odd-numbered stage counted from a bottom, and for discharging the fluid from this small cavity; and a second fluid flow passage for supplying pressurized fluid to at least one small cavity interposed between neighboring ones of the small diaphragm and the large diaphragm in even-numbered stage counted from the bottom, and for discharging the fluid from this small cavity.

5. A hybrid actuator comprising:

the fluid actuator described in claim 4; and a vibration actuator which is connected to the fluid actuator in series.

6. A hybrid actuator comprising:

the fluid actuator described in claim 4;

a vibration actuator; and an elastic member which is connected to the fluid actuator and the vibration actuator to one another in series.

7. A fluid actuator comprising:

a single core disposed inside the cylinder casing;

at least one friction-less, small diaphragm which is interposed between the cylinder casing and the core and does not interfere with upward and downward relative movement of the core and the cylinder casing and the core;

a plurality of friction-less, large diaphragms, each of which is interposed in alternate relation with the small diaphragm between the core and the cylinder casing and does not interfere with upward and downward relative movement of the core and the cylinder casing and has an effective pressure-receiving area larger than that of the small diaphragm;

a fluid flow passage for supplying pressurized fluid to small cavities interposed between neighboring ones of the small diaphragm and the large diaphragms or between a lowest large diaphragm and a bottom portion of the cylinder casing in an odd-numbered stage counted from a bottom, and for discharging the fluid from the small cavity; and an opening which allows at least one small cavity interposed between neighboring ones of the small diaphragm and the large diaphragms in even-numbered stage counted from the bottom to communicate with the atmosphere.

8. A hybrid actuator comprising:

the fluid actuator described in claim 7; and a vibration actuator which is connected to the fluid actuator in series.

9. A hybrid actuator comprising:

the fluid actuator described in claim 7;

a vibration actuator; and an elastic member which is connected to the fluid actuator and the vibration actuator to one another in series.

10. A fluid actuator comprising:

a cylinder casing-opened at its upper portion;

a single core disposed inside the cylinder casing;

at least one friction-less small diaphragm which is interposed between the cylinder casing and the core and does not interfere with upward and downward relative movement of the cylinder casing and the core;

at least one friction-less, large diaphragm which is interposed in alternate relation with the small diaphragm between the core and the cylinder casing and does not interfere with upward and downward relative movement of the core and the cylinder casing and has an effective pressure-receiving area larger than that of the small diaphragm;

a first fluid flow passage for supplying pressurized fluid to at least one small cavity interposed between neighboring ones of the small diaphragm and the large diaphragm or between a lowest large diaphragm and a bottom portion of the cylinder casing in odd-numbered stage counted from a bottom, and for discharging the fluid from this small cavity; and a second fluid flow passage for supplying pressurized fluid to at least one small cavity interposed between neighboring ones of the small diaphragm and the large diaphragm in even-numbered stage counted from the bottom, and for discharging the fluid from this small cavity.

11. A hybrid actuator comprising:

the fluid actuator described in claim 10; and a vibration actuator which is connected to the fluid actuator in series.

12. A hybrid actuator comprising:

the fluid actuator described in claim 10;

a vibration actuator; and an elastic member which is connected to the fluid actuator and the vibration actuator to one another in series.

13. A fluid actuator comprising:

a cylinder casing opened at its upper and lower portions;

a single core disposed inside the cylinder casing;

a small friction-less diaphragm which is interposed between the cylinder casing and the core and does not interfere with upward and downward relative movement of the cylinder casing and the core;

a large friction-less diaphragm which is interposed between the core and the cylinder casing and does not interfere with upward and downward relative movement of the core and the cylinder casing and has an effective pressure-receiving area larger than that of the small diaphragm; and a fluid flow passage for supplying pressurized fluid to a small cavity interposed between the small diaphragm and the large diaphragm and for discharging the fluid from this small cavity.

14. A hybrid actuator comprising:

the fluid actuator described in claim 13; and a vibration actuator which is connected to the fluid actuator in series.

15. A hybrid actuator comprising:

the fluid actuator described in claim 13;

a vibration actuator; and an elastic member which is connected to the fluid actuator and the vibration actuator to one another in series.

16. A fluid actuator comprising:

a cylinder casing opened at its upper and lower portions;

a single core disposed inside the cylinder casing;

at least one small friction-less diaphragm which is interposed between the cylinder casing and the core and does not interfere with upward and downward relative movement of the cylinder casing and the core;

a plurality of large friction-less diaphragms each of which is interposed in alternate relation with the small diaphragm between the core and the cylinder casing and does not interfere with upward and downward relative movement of the core and the cylinder casing and has an effective pressure-receiving area larger than that of the small diaphragm;

a fluid flow passage for supplying pressurized fluid to a small cavity interposed between neighboring ones of the small diaphragm and the large diaphragms in odd-numbered stage counted from a bottom, and for discharging the fluid from this small cavity; and an opening which allows a small cavity interposed between neighboring ones of the small diaphragm and the large diaphragms in even-numbered stage, to communicate with the atmosphere.

17. A hybrid actuator comprising:

the fluid actuator described in claim 16; and a vibration actuator which is connected to the fluid actuator in series.

18. A hybrid actuator comprising:

the fluid actuator described in claim 16;

a vibration actuator; and an elastic member which is connected to the fluid actuator and the vibration actuator to one another in series.

19. A fluid actuator comprising:

a cylinder casing opened at its upper and lower portions;

a single core disposed inside the cylinder casing;

at least one small friction-less diaphragm which is interposed between the cylinder casing and the core and does not interfere with upward and downward relative movement of the cylinder casing and the core;

a plurality of large friction-less diaphragms each of which is interposed in alternative relation with the small diaphragm between the core and the cylinder casing and does not interfere with upward and downward relative movement of the core and the cylinder casing and has an effective pressure-receiving area larger than that of the small diaphragm;

a first fluid flow passage for supplying pressurized fluid to a small cavity interposed between neighboring ones of the small diaphragm and the large diaphragms in even-numbered stage, and for discharging the fluid from this small cavity.

20. A hybrid actuator comprising:

the fluid actuator described in claim 19; and a vibration actuator which is connected to the fluid actuator in series.

21. A hybrid actuator comprising:

the fluid actuator described in claim 19;

a vibration actuator; and an elastic member which is connected to the fluid actuator and the vibration actuator to one another in series.

* * * * *